United States Patent
Alberton et al.

(10) Patent No.: US 10,482,285 B2
(45) Date of Patent: *Nov. 19, 2019

(54) EVENT PROCESSING SYSTEM

(71) Applicant: Mediasift Limited, Reading (GB)

(72) Inventors: Lorenzo Alberton, Reading (GB);
Alistair Joseph Bastian, Surrey (GB);
Timothy David Budden, Henley on Thames (GB)

(73) Assignee: Mediasift Limited, Reading (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/029,504

(22) Filed: Jul. 6, 2018

(65) Prior Publication Data
US 2018/0314854 A1 Nov. 1, 2018

Related U.S. Application Data

(63) Continuation of application No. 15/611,517, filed on Jun. 1, 2017, which is a continuation of application No. 15/462,369, filed on Mar. 17, 2017.

(51) Int. Cl.
*G06F 21/62* (2013.01)
*G06Q 50/00* (2012.01)
*G06F 16/903* (2019.01)
*G06F 16/2457* (2019.01)

(52) U.S. Cl.
CPC ...... *G06F 21/6254* (2013.01); *G06F 16/2457* (2019.01); *G06F 16/90335* (2019.01); *G06Q 50/01* (2013.01)

(58) Field of Classification Search
CPC ........ G06F 21/6254; G06F 9/44; G06F 17/30; G06F 11/00; G06F 11/07; G06F 16/90335; G06F 16/2457; H04M 1/663; H04M 3/487; G06K 9/00; G06K 9/62; G06K 9/64; G06Q 30/08; G06Q 30/02; G06Q 50/01; H04W 68/04; H04W 68/02; H04W 68/00; G06T 1/20
USPC .............. 726/26; 717/128; 707/722; 382/118
See application file for complete search history.

(56) References Cited

U.S. PATENT DOCUMENTS

| | | | |
|---|---|---|---|
| 5,915,250 A | 6/1999 | Jain et al. | |
| 8,346,792 B1 | 1/2013 | Baker et al. | |
| 8,909,646 B1 | 12/2014 | Fabrikant et al. | |
| 9,235,461 B2 * | 1/2016 | Palframan | G06F 11/0751 |
| 9,734,517 B2 * | 8/2017 | Lee | G06F 17/30867 |
| 9,787,662 B1 | 10/2017 | Nair et al. | |

(Continued)

OTHER PUBLICATIONS

"'Above the Trend Line'—Your Industry Rumor Central for Jan. 23, 2017," insideBIGDATA, Jan. 23, 2017, URL=https://insidebigdata.com/2017/01/23/above-the-trend-line-your-industry-rumor-central-for-1232017, download date Oct. 30, 2017, 4 pages.

(Continued)

*Primary Examiner* — Thanhnga B Truong
(74) *Attorney, Agent, or Firm* — Seed IP Law Group LLP

(57) ABSTRACT

User events of a platform are processed to extract aggregate information about users of the platform at an event processing system. A query relating to the user events is received at the system and at least one query parameter is determined from the query. Various privacy controls are disclosed for ensuring that any information released in response to the query cannot be used to identify users individually or to infer information about individual users.

20 Claims, 12 Drawing Sheets

(56) References Cited

U.S. PATENT DOCUMENTS

| | | | |
|---|---|---|---|
| 10,025,645 | B1 | 7/2018 | Bastian et al. |
| 2006/0106762 | A1 | 5/2006 | Caracas et al. |
| 2007/0033275 | A1 | 2/2007 | Toivonen et al. |
| 2008/0288473 | A1 | 11/2008 | Hu et al. |
| 2010/0007543 | A1 | 1/2010 | Mueck |
| 2010/0114871 | A1 | 5/2010 | Cheong et al. |
| 2010/0229157 | A1* | 9/2010 | Ergan .................. G06F 11/0748 717/128 |
| 2012/0047219 | A1 | 2/2012 | Feng et al. |
| 2012/0078894 | A1 | 3/2012 | Jiang et al. |
| 2013/0144715 | A1 | 6/2013 | Kranzley et al. |
| 2013/0290350 | A1 | 10/2013 | Mueen et al. |
| 2015/0089522 | A1 | 3/2015 | Volovich et al. |
| 2015/0163235 | A1 | 6/2015 | Coskun et al. |
| 2015/0186493 | A1 | 7/2015 | Balmin et al. |
| 2015/0293923 | A1 | 10/2015 | Eide et al. |
| 2016/0034749 | A1* | 2/2016 | Poplavski .......... G06K 9/00281 382/118 |
| 2016/0203143 | A1* | 7/2016 | Kritt ................. G06F 17/30061 707/722 |

OTHER PUBLICATIONS

"Acuerdo Entre Linkdin y Datasift Hace Más Publicitaria a Esta Red," enter.co, Jan. 18, 2017, URL=http://www.enter.co/culturadigital/negocios/acuerdo-entre-linkdin-y-datasift-hace-mas-publicitaria-a-esta-red-social, download date Oct. 30, 2017, 5 pages (with English Machine Translation).
"Ad Roundup: Partnerships and a malware offer," BizReport, Jan. 23, 2017, URL=http://www.bizreport.com/2017/01/ad-roundup-partnerships-and-a-malware-offer.html, download date Oct. 30, 2017, 5 pages.
"Busting Brand Myths with Facebook Topic Data," DataSift, 32 pages.
"Cloud Dataflow: Simplified stream and batch data processing, with equal reliability and expressiveness," Google Cloud Platform, URL= https://cloud.google.com/dataflow, download date Oct. 30, 2017, 8 pages.
"Controversial New Facebook Analytics Tool Allows Marketers to Gather User Data Based on Topics," ContentStandard, Mar. 27, 2015, URL=https://www.skyword.com/contentstandard/marketing/controversial-new-facebook-analytics-tool-allows-marketers-to-gather-user-data-based-on-topics, download date Oct. 30, 2017, 4 pages.
"Count on Elasticsearch!," Elastic, Apr. 3, 2014, URL=https://www.elastic.co/blog/count-elasticsearch, download date Mar. 5, 2017, 4 pages.
"Crossing the Streams—Joins in Apache Kafka," codecentric Blog, Feb. 15, 2017, URL=https://blog.codecentric.de/en/2017/02/crossing-streams-joins-apache-kafka, download date Oct. 30, 2017, 9 pages.
Dalsass et al., "An eventful journey to real-time joins with Storm and Kafka," Criteo, 41 pages, 2012.
"DataSift and LinkedIn: A new angle for social media analytics," ZDNet, Jan. 24, 2017, URL=http://www.zdnet.com/article/datasift-and-linkedin-a-new-angle-for-social-media-analytics, download date Oct. 30, 2017, 12 pages.
"DataSift connects with LinkedIn as its latest social marketing partner," TechCrunch, Jan. 18, 2017, URL=https://techcrunch.com/2017/01/18/datasift-connects-with-linkedin-as-its-latest-social-marketing-partner, download date Oct. 30, 2017, 10 pages.
"DataSift offers first analysis at scale of how LinkedIn's members engage with content," Martech, Jan. 19, 2017, URL=https://martechtoday.com/datasift-offers-first-analysis-scale-linkedins-members-engage-content-194363, download date Oct. 30, 2017, 5 pages.
"DataSift Partners with LinkedIn," CRM Magazine, Jan. 18, 2017, URL=http://www.destinationcrm.com/Articles/CRMNews/CRM-Across-the-Wire/DataSift-Partners-with-LinkedIn-115837.aspx, download date Oct. 30, 2017, 2 pages.

"DataSift Partners with LinkedIn, Launches PYLON for LinkedIn Engagement Insights," MarTech Advisor, Jan. 19, 2017, URL= https://www.martechadvisor.com/news/bi-ci-data-science/datasift-partners-with-linkedin-launches-pylon-for-linkedin-engagement-insights, download date Oct. 30, 2017, 6 pages.
"DataSift partners with LinkedIn to offer marketers with advanced insights into its user data," MSPoweruser, Jan. 18, 2017, URL= https://mspoweruser.com/datasift-partners-with-linkedin-to-offer-marketers-with-advanced-insights-into-its-user-data, download date Oct. 30, 2017, 15 pages.
"DataSift partners with LinkedIn to take marketer insights to the next level through AI," MarketingTech, Jan. 23, 2017, URL= https://www.marketingtechnews.net/news/2017/jan/23/datasift-partners-linkedin-take-marketer-insights-next-level-through-ai, download date Dec. 13, 2017, 6 pages.
"Di cosa parlano gli utenti su Facebook?," Wired, Mar. 23, 2015, URL= https://www.wired.it/internet/social-network/2015/03/23/cosa-dicono-utenti-facebook, download date Oct. 30, 2017, 7 pages (with English Machine Translation).
"Dissecting Facebook's Topic Data: What Consumers & Brands Need to Know," SocialMediaToday, Mar. 24, 2015, URL=https://www.socialmediatoday.com/socialnetworks/2015-03-24/dissecting-facebooks-topic-data-what-consumers-brands-need-know, download date Oct. 30, 2017, 3 pages.
"Distributed, Real-time Joins and Aggregations on User Activity Events using Kafka Streams," Confluent, Jun. 23, 2016, URL= https://www.confluent.io/blog/distributed-real-time-joins-and-aggregations-on-user-activity-events-using-kafka-streams, download date Oct. 30, 2017, 21 pages.
"Do You Care About What People Say About Your Brand on Facebook?," CMSWire, Mar. 26, 2015, URL=https://www.cmswire.com/cms/analytics/do-you-care-what-people-say-about-your-brand-on-facebook-028611.php, download date Oct. 30, 2017, 6 pages.
"Facebook announces Topic Data, a new way to learn what matters to your audience," Pulsar, Mar. 10, 2015, URL=http://www.pulsarplatform.com/blog/2015/facebook-releases-topic-data, download date Oct. 30, 2017, 3 pages.
"Facebook apre a selezionati advertiser la sua preziosa mole di dati," Programmatic Italia, Mar. 16, 2015, URL=http://www.programmatic-italia.com/facebook-apre-selezionati-advertiser-sua-preziosa-mole-dati/#xhtZ5BYHeGtR1WS7.97, download date Oct. 30, 2017, 3 pages (with English Machine Translation).
"Facebook Begins Providing Topic Data to Select Marketers," DrivingSales News, Mar. 11, 2015, URL=http://www.drivingsales.com/news/facebook-begins-providing-topic-data-to-select-marketers, download date Oct. 30, 2017, 4 pages.
"Facebook budet peredavat dannyye polzovateley storonnim kompaniyam," Ekonomika Sevodnia, Mar. 12, 2015, URL=https://rueconomics.ru/44642-facebook-budet-peredavat-dannyie-polzovateley-storonnim-kompaniyam, download date Oct. 30, 2017, 2 pages (with English Machine Translation).
"Facebook DataSift Gives Select Marketers Access to Big Topic Data," SocialMediaToday, Mar. 12, 2015, URL=https://www.socialmediatoday.com/social-networks/2015-03-12/facebook-datasift-gives-select-marketers-access-big-topic-data, download date Oct. 30, 2017, 3 pages.
"Facebook to Explain More About Your Activities to its Advertisers," The Next Digit, Mar. 11, 2015, URL=http://thenextdigit.com/18671/facebook-explain-activities-advertisers/, download date Oct. 30, 2017, 2 pages.
"Facebook Finally Lets Its Firehose Be Tapped for Marketing Insights Thanks to DataSift," TechCrunch, Mar. 10, 2015, URL= https://techcrunch.com/2015/03/10/facebook-topic-data/, download date Oct. 30, 2017, 8 pages.
"Facebook finally opens its data firehose to select advertisers," Mashable, Mar. 12, 2015, URL=http://mashable.com/2015/03/12/facebook-topic-data/#TQnIYjzNFZqN, download date Oct. 30, 2017, 5 pages.
"Facebook Inc. (FB) Is Copying Twitter Inc. Again," The Motley Fool, Mar. 20, 2015, URL=https://www.fool.com/investing/general/2015/03/20/facebook-inc-fb-is-copying-twitter-inc-again.aspx, download date Oct. 30, 2017, 4 pages.

(56) References Cited

OTHER PUBLICATIONS

"Facebook Inc to Tell Advertisers What Users Are Talking About," ValueWalk, Mar. 11, 2015, URL=http://www.valuewalk.com/2015/03/facebook-advertiser-what-user-talking/, download date Oct. 30, 2017, 3 pages.
"Facebook Inc (FB) Topic Data Service: Another Threat to Privacy?," TechInsider, Mar. 11, 2015, URL=http://www.techinsider.net/facebook-inc-fb-topic-data-service-another-threat-to-privacy/1120838.html, download date Oct. 30, 2017, 3 pages.
"Facebook Inc (FB) Unveils New Data Analysis Tool for Marketers," Insider Monkey, Mar. 12, 2015, URL=http://www.insidermonkey.com/blog/facebook-inc-fb-unveils-new-data-analysis-tool-for-marketers-340281/, download date Oct. 30, 2017, 3 pages.
"Facebook Introduces New Business Analytics Tool "Topic Data" with DataSift: Opens Doors for Marketers, Advertisers," Customs Today, Mar. 12, 2015, URL=http://www.customstoday.com.pk/facebook-introduces-new-business-analytics-tool-topic-data-with-datasift-opens-doors-for-marketers-advertisers-2/, download date Oct. 30, 2017, 2 pages.
"Facebook Introduces Topic Data," Adweek, Mar. 10, 2015, URL=http://www.adweek.com/digital/topic-data/, download date Oct. 30, 2017, 8 pages.
"Facebook Introduces Topic Data," SocialMediaToday, Mar. 12, 2015, URL=https://www.socialmediatoday.com/social-networks/2015-03-12/facebook-introduces-topic-data, download date Oct. 30, 2017, 2 pages.
"Facebook introduces 'Topic Data' to help marketers understand their target audience," The Drum, Mar. 11, 2015, URL=http://www.thedrum.com/news/2015/03/11/facebook-introduces-topic-data-help-marketers-understand-their-target-audience-0, download date Oct. 30, 2017, 2 pages.
"Facebook Introduces Topic Data: Learn What Your Audience Is Discussing on Facebook," Search Engine Journal, URL=https://www.searchenginejournal.com/facebook-introduces-topic-data-see-what-your-audience-is-saying-about-various-subjects/127912/, download date Oct. 30, 2017, 2 pages.
"Facebook Lancia un Tool di Social Media Analysis," MarketingArena, Mar. 24, 2015, URL=https://www.marketingarena.it/2015/03/24/facebook-lancia-un-tool-di-social-media-analysis/, download date Dec. 27, 2017, 2 pages (with English Machine Translation).
"Facebook launches new analytics tool—'Topic Data,'" Uncover California, Mar. 13, 2015, URL=http://uncovercalifornia.com/content/23623-facebook-launches-new-analytics-tool-topic-data, download date Oct. 30, 2017, 2 pages.
"Facebook launches new data analysis tool to measure social conversations," wwwhat's new, Mar. 10, 2015, URL=https://wwwhatsnew.com/2015/03/10/facebook-lanza-nueva-herramienta-de-analisis-de-datos-para-medir-las-conversaciones-sociales/, download date Oct. 30, 2017, 3 pages.
"Facebook Launching New Product to Help Brands Get Feedback," TechFrag, URL=http://techfrag.com/2015/03/11/facebook-launching-new-product-help-brands-get-feedback/, download date Oct. 30, 2017, 2 pages.
"Facebook to let marketers see what people are talking about," Naked Security, Mar. 12, 2015, URL=https://nakedsecurity.sophos.com/2015/03/12/facebook-to-let-marketers-listen-in-on-what-people-are-talking-about/, download date Oct. 30, 2017, 3 pages.
"Facebook Lets Advertisers Eavesdrop on Your Conversations," Huffington Post, May 13, 2015, URL=https://www.huffingtonpost.com/entry/facebook-lets-advertisers_b_6867426.html, download date Oct. 30, 2017, 2 pages.
"Facebook Lets Marketers See What Users Talk About With Topic Data," ClickZ, Mar. 10, 2015, URL=https://www.clickz.com/facebook-lets-marketers-see-what-users-talk-about-with-topic-data/26897/, download date Dec. 27, 2017, 2 pages.
"Facebook letting advertisers take a deeper look at users' posts," CIO New Zealand, URL=https://www.cio.co.nz/article/570017/facebook-letting-advertisers-take-deeper-look-users-posts/, download date Oct. 30, 2017, 1 page.
"Facebook Looks to Compete with Twitter for Data Monetization," ETCentric, Mar. 16, 2015, URL=http://www.etcentric.org/facebook-looks-to-compete-with-twitter-for-data-monetization, download date Oct. 30, 2017, 2 pages.
"Facebook is Making its Firehose Available to Select Advertisers," iamwire, URL=http://www.iamwire.com/2015/03/facebook-making-firehose-select-advertisers/111852, download date Oct. 30, 2017, 1 page.
"Facebook to mine user data for marketers," IT News, Mar. 12, 2015, URL=https://www.itnews.com.au/news/facebook-to-mine-user-data-for-marketers-401574, download date Oct. 30, 2017, 2 pages.
"Facebook mines user data to become a market consultant," The Australian, Mar. 12, 2015, URL=http://www.theaustralian.com.au/business/wall-street-journal/facebook-mines-user-data-to-become-a-market-consultant/news-story, download date Oct. 30, 2017, 1 page.
"Facebook's new 'Topic Data' tells marketers what you talk about," SiliconANGLE, Mar. 11, 2015, URL=https://siliconangle.com/blog/2015/03/11/facebooks-new-topic-data-tells-marketers-what-you-talk-about/, download date Oct. 30, 2017, 2 pages.
"Facebook Now Provides Select Partners With In-Depth Topic Data," Web Marketing Pros, Mar. 13, 2015, URL=http://www.webmarketingpros.com/blog/facebook-now-provides-select-partners-with-in-depth-topic-data/, download date Oct. 30, 2017, 3 pages.
"Facebook to offer insights on what users are talking about," CNET, Mar. 10, 2015, URL=https://www.cnet.com/news/facebook-to-offer-insights-about-what-users-are-talking-about/, download date Oct. 30, 2017, 3 pages.
"Facebook Opens its Data Firehose," ResearchLive, Mar. 12, 2015, URL=https://www.researchlive.com/article/news/facebook-opens-its-data-firehose/id/4013026, download date Oct. 30, 2017, 2 pages.
"Facebook Opens its Own Private Firehose," datanami, Mar. 11, 2015, URL=https://www.datanami.com/2015/03/11/facebook-opens-its-own-private-firehose/, download date Oct. 30, 2017, 2 pages.
"Facebook Opens 'Topic Data' Firehose to Select Marketers," Marketing Land, Mar. 10, 2015, URL=https://marketingland.com/facebook-opens-topic-data-to-selected-marketers-120974, download date Oct. 30, 2017, 3 pages.
"Facebook opens up big data for select advertisers," ITProPortal, Mar. 12, 2015, URL=https://www.itproportal.com/2015/03/12/facebook-opens-big-data-select-advertisers/, download date Oct. 30, 2017, 2 pages.
"Facebook opens valve on data firehose," RetailDIVE, Mar. 10, 2015, URL=https://www.retaildive.com/news/facebook-opens-valve-on-data-firehose/373577/, download date Oct. 30, 2017, 2 pages.
"Facebook partners with Datasift to create more marketing intelligence," Infopresse, Mar. 10, 2015, URL=http://www.infopresse.com/article/2015/3/10/facebook-s-associe-avec-datasift-pour-creer-plus-d-intelligence-marketing, download date Oct. 30, 2017, 1 page.
"Facebook partners with DataSift of social data platform," CNET Japan, Mar. 11, 2015, URL=https://japan.cnet.com/article/35061607/, download date Oct. 30, 2017, 1 page.
"Facebook permitirá a los anunciantes ver qué es lo más popular," El Comercio, URL=https://elcomercio.pe/redessociales/facebook/facebook-permitira-anunciantes-ver-popular-341409, download date Oct. 30, 2017, 2 pages (with English Machine Translation).
"Facebook to Relay to Brands What Fans Talk About," Chiefmarketer, Mar. 10, 2015, URL=http://www.chiefmarketer.com/facebook-relay-brands-fans-talk/, download date Oct. 30, 2017, 1 page.
"Facebook reveals user data to a handful of advertising partners," Digital Journal, Mar. 18, 2015, URL=http://www.digitaljournal.com/technology/facebook-makes-big-data-available-to-select-marketers/article/428591, download date Oct. 30, 2017, 3 pages.
"Facebook to Sell Advertisers Info on Trending Topics," The Telecom Blog, Mar. 13, 2015, URL=https://www.thetelecomblog.com/2015/03/13/facebook-to-sell-advertisers-info-on-trending-topics/, download date Oct. 30, 2017, 1 pages.
"Facebook shares users' conversations with marketers," The Tech Bulletin, Mar. 13, 2015, URL=http://www.thetechbulletin.com/facebook-shares-users-conversations-with-marketers-19432/, download date Oct. 30, 2017, 3 page.

(56) References Cited

OTHER PUBLICATIONS

"Facebook is Sharing Your Conversations with Advertisers," Load the Game, Mar. 12, 2015, URL=http://www.loadthegame.com/2015/03/12/facebook-sharing-conversations-advertisers/, download date Oct. 30, 2017, 3 pages.
"Facebook's shiny new analysis tool lets marketers dive into customer data," ITPro, Mar. 11, 2015, URL=http://www.itpro.co.uk/businessintelligence/24210/facebooks-shiny-new-analysis-tool-lets-marketers-dive-into-customer-data, download date Oct. 30, 2017, 2 pages.
"Facebook slammed after advertising funeral directors to a CANCER patient: Promotions appeared after sufferer Googled disease," Daily Mail Online, Mar. 11, 2015, URL=http://www.dailymail.co.uk/sciencetech/article-2989768/Facebook-slammed-advertising-funeral-directors-CANCER-patient-Promotions-appeared-sufferer-Googled-disease.html, download date Oct. 30, 2017, 5 pages.
"Facebook to Start Telling Brands Who's Talking About What Topics," AdAge, Mar. 10, 2015, URL=http://adage.com/print/297507, download date Dec. 13, 2017, 3 pages.
"Facebook Takes on New Role: Marketing Consultant," Wall Street Journal, Mar. 10, 2015, URL=https://www.wsj.com/articles/facebook-takes-on-new-role-marketing-consultant-1426036185, download date Oct. 30, 2017, 2 pages.
"Facebook Tells Marketers About What Users Are Saying," WebProNews, Mar. 10, 2015, URL=https://www.webpronews.com/feed/, download date Oct. 30, 2017, 5 pages.
"Facebook Topic Data," Vimeo, URL=https://vimeo.com/167333071, download date Oct. 30, 2017, 1 page.
"Facebook's 'Topic Data' Adds Brainy to Brands," Inbound Authority, Mar. 16, 2015, URL=http://www.inboundauthority.com/uncategorized/facebooks-topic-data-adds-brainy-to-brands!, download date Oct. 30, 2017, 3 pages.
"Facebook's Topic Data Is a Hot Topic," Adweek, Mar. 11, 2015, URL=http://www.adweek.com/digital/facebook-topic-data-reax/, download date Jan. 2, 2018, 5 pages.
"Facebook's Topic Data: New Initiative Could Help Marketers Get 'Holistic View' of Audiences," Mobile Advertising Watch, URL=http://mobileadvertisingwatch.com/facebooks-topic-data-new-initiative-could-help-marketers-get-holistic-view-of-audiences-16307, download date Oct. 30, 2017, 1 page.
"Facebook Topic Data to Offer New Insights to Marketers," Castleford, Mar. 10, 2015, URL=https://www.castleford.com.au/contentmarketingblog/facebook-topic-data-to-offer-new-insights-to-marketers, download date Oct. 30, 2017, 3 pages.
"Facebook's Topic Data tells advertisers what users are talking about," BizReport, Mar. 12, 2015, URL=http://www.bizreport.com/2015/03/facebooks-topic-data-tells-advertisers-what-users-are-talkin.html, download date Oct. 30, 2017.
"Facebook Turning Your News Feed Chatter Into Ad Dollars," PCMag UK, Mar. 11, 2015, URL=http://uk.pcmag.com/news/40339/facebook-turning-your-news-feed-chatter-into-ad-dollars, download date Oct. 30, 2017, 2 pages.
"Facebook will allow advertisers to follow conversations of their users," PCWorld, Mar. 11, 2015, URL=http://www.pcworldenespanol.com/2015/03/11/facebook-permitira-anunciantes-poder-ver-mas-fondo-las-publicaciones-de-sus-usuarios/, download date Oct. 30, 2017, 2 pages.
"Facebook will monitor our responses and provide feedback to advertisers," PCLab, Mar. 16, 2015, URL=http://pclab.pl/news62592.html, download date Oct. 30, 2017, 2 pages.
"Facebook Will Provide Audience Data for Marketer Insights," Wall Street Journal, Mar. 10, 2015, URL=https://blogs.wsj.com/cmo/2015/03/10/facebook-will-provide-audience-data-for-marketer-insights/, download date Oct. 30, 2017, 1 page.
"Facebook will provide information about users to marketing companies," ZN.ua, Mar. 12, 2015, URL=https://zn.ua/TECHNOLOGIES/facebook-budet-predostavlyat-informaciyu-o-polzovatelyah-marketingovym-kompaniyam-169598_.html, download date Oct. 30, 2017, 4 pages.
"Facebook will first see what users are talking about," Digitalic, Mar. 19, 2015, URL=https://www.digitalic.it/internet/social-network/facebook-fara-vedere-per-la-prima-volta-di-cosa-parlano-gli-utenti, download date Oct. 30, 2017, 1 page.
"Facebook will let advertisers know what their users are talking about," TransMedia.cl, Mar. 12, 2015, URL=http://www.transmedia.cl/noticia3=id120315.htm, download date Oct. 30, 2017, 1 page.
"Facebook Will Offer Marketing Consultancy," Trinity News Daily, Mar. 11, 2015, URL=https://www.trinitynewsdaily.com/facebook-will-offer-marketing-consultancy/1195/, download date Jan. 3, 2018, 2 pages.
"Facebook Will Tell Marketers What Users Are Saying," Top Tech News, Mar. 10, 2015, URL=https://www.toptechnews.com/article/index.php?story_id=022001TW1L30, download date Oct. 30, 2017, 2 pages.
"A First Look at Facebook Topic Data," Vimeo, URL=https://vimeo.com/126525535, download date Oct. 30, 2017, 3 pages (Screenshot Only).
"Five Things This Marketing Geek Is Hoping for At F8 Facebook Developer Conference," Social Media Insider, Mar. 25, 2015, URL=https://www.mediapost.com/publications/article/246441/five-things-this-marketing-geek-is-hoping-for-at-f.html, download date Oct. 30, 2017, 3 pages.
Flajolet et al., "HyperLogLog: the analysis of a near-optimal cardinality estimation algorithm," *2007 Conference on Analysis of Algorithms*, 2007, pp. 127-146.
"Guest Column: Facebook in 2015 and the Road Ahead," PromaxBDA, Mar. 25, 2015, URL=http://brief.promaxbda.org/content/guest-column-facebook-in-2015-and-the-road-ahead, download date Oct. 30, 2017, 7 pages.
"How Can Marketers/Companies Benefit From Tapping Into Facebook Inc (FB) Data?," Insider Monkey, Mar. 12, 2015, URL=http://www.insidermonkey.com/blog/how-can-marketers-companies-benefit-from-tapping-into-facebook-inc-fb-data-340314/, download date Oct. 30, 2017, 3 pages.
"How IBM Will Help Brands Understand Tweets Better Using Analytics," TheStreet, Mar. 17, 2015, URL=https://www.thestreet.com/story/13080495/1/how-ibm-will-help-brands-understand-tweets-better-using-analytics.html, download date Oct. 30, 2017, 3 pages.
"IBM Introduces Twitter-Fueled Data Services for Business," The New York Times, Mar. 17, 2015, URL=https://bits.blogs.nytimes.com/2015/03/17/ibm-introduces-twitter-fueled-data-services-for-business/, download date Oct. 30, 2017, 3 pages.
"International Business Machines Corp. (NYSE:IBM) Moves Ahead of the Competition With Data Service Business From Twitter Inc (NYSE:TWTR)," US Markets Daily, URL=https://www.usmarketsdaily.com/international-business-machines-corp-nyseibm-moves-ahead-of-the-competition-with-data-service-business-from-twitter-inc-nysetwtr-10539, download date Oct. 30, 2017, 2 pages.
International Search Report and Written Opinion, Mailed May 16, 2018, for International Application No. PCT/EP2018/056740, 18 pages.
"Introducing Kafka Streams, the new stream processing library of Apache Kafka, Berlin Buzzwords 2016," SlideShare, Jun. 13, 2016, URL=https://www.slideshare.net/MichaelNoll4/introducing-kafka-streams-the-new-stream-processing-library-of-apache-kafka-berlin-buzzwords-2016, download date Oct. 30, 2017, 5 pages.
"Join: Storm in a Teacup," Adform, Nov. 17, 2015, URL=http://engineering.adform.com/blog/data/join-storm-in-a-teacup, download date Oct. 30, 2017, 10 pages.
"Kafka Streams—Not Looking at Facebook," Timothy Renner, Jan. 19, 2015, URL=https://timothyrenner.github.io/engineering/2016/08/11/kafka-streams-not-looking-at-facebook.html, download date Oct. 30, 2017, 7 pages.
"Learn What Matters to Your Audience: The Emergence of Topic Data on Facebook," Business 2 Community, Mar. 24, 2015, URL=http://www.business2community.com/facebook/learn-matters-audience-emergence-topic-data-facebook-01190392#j16pmDSIGgFuOVAb.97, download date Oct. 30, 2017, 3 pages.
Levitov, "Executive Summary and Technology Description," *Well Smart-Tech, LLC Strategic Business Plan*, Nov. 18, 2014, 8 pages.
"LinkedIn améliore ses capacités de ciblage publicitaire avec DataSift," Offremedia, URL=https://www.offremedia.com/linkedin-ameliore-

(56) References Cited

OTHER PUBLICATIONS ses-capacites-de-ciblage-publicitaire-avec-datasift, download date Oct. 30, 2017, 2 pages (with English Machine Translation).
"LinkedIn and DataSift Partner to Provide B2B Data Insights," Mobile Marketing, Jan. 19, 2017, URL=http://mobilemarketingmagazine.com/linkedin-datasift-partner-provide-b2b-data-insights, download date Oct. 30, 2017, 2 pages.
"LinkedIn debuts new desktop version with 'chatbots', new search and more," TechCrunch, Jan. 19, 2017, URL=https://techcrunch.com/2017/01/19/linkedin-desktop-update/, download date Oct. 30, 2017.
"LinkedIn Engagement Insights for Data-Driven Marketers," Website Magazine, Jan. 18, 2017, URL=https://www.websitemagazine.com/blog/linkedin-engagement-insights-for-data-driven-marketers, download date Oct. 30, 2017, 1 page.
"LinkedIn Gives Access to B-to-B Insights Through DataSift Deal," AdAge, Jan. 18, 2017, URL=http://adage.com/article/datadriven-marketing/linkedin-access-b-b-insights-datasift/307530/, download date Oct. 30, 2017, 5 pages.
"LinkedIn Launches Re-Vamped Desktop Experience," Social Media Today, Jan. 19, 2017, URL=https://www.socialmediatoday.com/social-business/linkedin-launches-re-vamped-desktop-experience, download date Oct. 30, 2017, 6 pages.
"LinkedIn partners with DataSift to offer more user data to advertisers," On MSFT, URL=https://www.onmsft.com/news/linkedin-partners-with-datasift-to-offer-more-user-data-to-advertisers, download date Oct. 30, 2017, 1 page.
"LinkedIn, più dati a disposizione delle aziende," Programmatic Italia, URL=http://www.programmatic-italia.com/linkedin-data-sift-piu-dati-per-le-aziende/#4MC6qfYm2lZOtcCa.97, download date Oct. 30, 2017, 3 pages (with English Machine Translation).
"LinkedIn renouvelle son interface bureau pour optimiser le networking," ITespresso, URL=http://www.itespresso.fr/linkedin-linterface-bureau-remise-au-gout-du-jour-146622.html?inf_by=5a4d1452681db8470a8b492e, download date Oct. 30, 2017, 4 pages (with English Machine Translation).
"LinkedIn streamlines search in desktop revamp," Marketing Dive, Jan. 20, 2017, URL=https://www.marketingdive.com/news/linkedin-streamlines-search-in-desktop-revamp/434407/, download date Oct. 30, 2017, 2 pages.
"LinkedIn VP of Product Russ Glass on DataSift, Redesign," Twitter, Jan. 20, 2017, URL=https://twitter.com/cheddar/status/822545731538063365, download date Jan. 3, 2018 (screenshot of video only), 1 page.
"LinkedIn wants more ad dollars, so it's offering up more user data to advertisers," Recode, Jan. 18, 2017, URL=https://www.recode.net/2017/1/18/14308060/linkedin-datasift-partnership-advertising, download date Oct. 30, 2017, 3 pages.
"Marketers tap into Facebook," Fox Business Video, URL=http://video.foxbusiness.com/v/4105407057001, download date Oct. 30, 2017 (screenshot only), 1 page.
"Media Strategies for LinkedIn Engagement Insights," DataSift Developer Site, URL=https://dev.datasift.com/#redaction, download date Oct. 30, 2017, 2 pages.
"New Facebook data analysis tool shows marketers what their customers are talking about," VentureBeat, Mar. 10, 2015, URL=https://venturebeat.com/2015/03/10/new-facebook-data-analysis-tool-shows-marketers-what-their-customers-are-talking-about/, download date Oct. 30, 2017, 2 pages.
"New Facebook Marketing Tool Chews Up Data, Spits It Out," LinuxInsider, Mar. 17, 2015, URL=https://www.linuxinsider.com/story/81834.html, download date Oct. 30, 2017, 4 pages.
"New Facebook Service Helps Marketers Gauge Brand Appeal," Social Media & Marketing Daily, Mar. 10, 2015, URL=https://www.mediapost.com/publications/article/245355/new-facebook-service-helps-marketers-gauge-brand-a.html, download date Oct. 30, 2017, 2 pages.
"New LinkedIn Site Design Encourages Engagement," TechNewsWorld, Jan. 19, 2017, URL=https://www.technewsworld.com/story/84242.html, download date Oct. 30, 2017, 3 pages.
"Publicis, Dentsu and WPP Agencies Are Getting Reams of New LinkedIn Ads Data," Adweek, URL=http://www.adweek.com/digital/publicis-dentsu-and-wpp-agencies-are-getting-reams-new-linkedin-ads-data-175615/, download date Oct. 30, 2017, 3 pages.
"Publicis, WPP y Dentsu se unen al acuerdo de LinkedIn y DataSift," Dircomfidencial, URL=https://dircomfidencial.com/internet/publicis-wpp-y-dentsu-se-unen-al-acuerdo-de-linkedin-y-datasift-20170123-0401/, download date Jan. 3, 2018, 3 pages (with English Machine Translation).
"'Pylon': Facebook launches new tool for target group acquisition," Social Media Advertising, Mar. 12, 2015 URL=https://www.wuv.de/digital/pylon_facebook_launcht_neues_tool_zur_zielgruppenerfassung, download date Oct. 30, 2017, 2 pages.
"PYLON for Facebook Topic Data," DataSift, URL=http://datasift.com/products/pylon-for-facebook-topic-data/, download date Oct. 30, 2017, 4 pages.
"PYLON for Facebook Topic Data FAQ," DataSift, URL=http://datasift.com/products/pylon-for-facebook-topic-data/faq, download date Oct. 30, 2017, 4 pages.
"Pylon for LinkedIn Engagement Insights," DataSift, URL=http://datasift.com/products/pylon-for-linkedin-engagement-insights/, download date Oct. 30, 2017, 4 pages.
"PYLON for LinkedIn Engagement Insights FAQ," DataSift, URL=http://datasift.com/products/pylon-for-linkedin-engagement-insights/faq, download date Oct. 30, 2017, 5 pages.
"La Revue du Lundi Par We Are Social #251," We Are Social, Mar. 17, 2015, URL=https://wearesocial.com/fr/blog/2015/03/1a-revue-du-lundi-par-social-251, download date Oct. 30, 2017, 10 pages (with English Machine Translation).
"Social media: The value of joining a 'community,'" Bury Free Press, Mar. 22, 2015, URL=http://www.buryfreepress.co.uk/news/opinion/social-media-the-value-of-joining-a-community-1-6645663, download date Oct. 30, 2017, 4 pages.
"Staying on the Right Side of the Fence when Analyzing Human Data," Vimeo, URL=https://vimeo.com/149068622, download date Oct. 30, 2017 (screenshot only), 1 page.
"Stream Processing Hard Problems Part II: Data Access," LinkedIn Engineering, Aug. 22, 2016, URL=https://engineering.linkedin.com/blog/2016/08/stream-processing-hard-problems-part-ii-data-access, download date Oct. 30, 2017, 9 pages.
"Topic Data: Learn What Matters to Your Audience," Facebook, Mar. 10, 2015, URL=https://www.facebook.com/business/news/topic-data, download date Oct. 30, 2017, 2 pages.
"Topic Data is a Marketer's Dream: Learn What Matters to Your Audience," The Media Beast, Mar. 19, 2015, URL=https://www.themediabeast.com/topic-data-is-a-marketers-dream-learn-what-matters-to-your-audience/, download date Oct. 30, 2017, 4 pages.
"Topic Data: a potential show prep gold mine," radioinfo, Mar. 17, 2015, URL=https://radioinfo.com.au/news/topic-data-potential-show-prep-gold-mine, download date Oct. 30, 2017, 1 page.
"Twitter's Video Move; Facebook Offers Topic Data," Ad Exchanger, Mar. 11, 2015, URL=https://adexchanger.com/ad-exchange-news/wednesday-03112015/, download date Oct. 30, 2017, 4 pages.
"Weekly Review (1) 03/04 ~ 03/10," iThome, Mar. 14, 2015, URL=https://www.ithome.com/, download date Oct. 30, 2017, 5 pages.
"What Are Facebook Users Talking About? Advertisers Can Now Find Out," Recode, URL=https://www.recode.net/2015/3/10/11560028/facebook-topic-data-advertisers, download date Oct. 30, 2017, 3 pages.
"Why Facebook Is Giving Away Some of Its Best Data for Free," TheStreet, URL=https://www.thestreet.com/story/13077409/1/why-facebook-is-giving-away-some-of-its-best-data-for-free.html, download date Oct. 30, 2017, 2 pages.
U.S. Appl. No. 15/462,369, filed Mar. 17, 2017, Event Processing System.
U.S. Appl. No. 15/611,517, filed Jun. 1, 2017, Event Processing System.
Peddinti et al., "Web search query privacy: Evaluating query obfuscation and anonymizing networks", 2014, Journal of Computer Security, vol. 22, pp. 155-199.

\* cited by examiner

EVENT PROCESSING SYSTEM

TECHNICAL FIELD

The present invention relates to a system for processing events.

BACKGROUND

There are various contexts in which it is useful to extract aggregated and anonymized information relating to users of a platform.

For example, understanding what content audiences are publishing and consuming on social media platforms has been a goal for many for a long time. The value of social data is estimated at $1.3 trillion but most of it is untapped. Extracting the relevant information is challenging because of the vast quantity and variety of social media content that exists, and the sheer number of users on popular social media platforms, such as Facebook, Twitter, LinkedIn etc. It is also made even more challenging because preserving the privacy of the social media users is of the utmost importance.

A data platform that is available today under the name DataSift PYLON connects to real-time feeds of social data from various social media platforms (data sources), uncovers insights with sophisticated data augmentation, filtering and classification engine, and provides the data for analysis with an appropriate privacy protocol required by the data sources.

It allows insights to be drawn from posts, shares, re-shares, likes, comments, views, clicks and other social interactions across those social media platforms. A privacy-first approach is adopted to the social media data, whereby (among other things) results are exclusively provided in an aggregate and anonymized form that makes it impossible to identify any of the social media users individually.

In the context of event processing, the need arises in various contexts to analyze numbers of unique users on a platform—not only social media platforms where the events correspond to social interactions, but other types of platform with other types of user event.

SUMMARY

In order to preserve user privacy, it is desirable to impose restraints on the release of information from systems that process user events, such as events recording social interactions on a social media platform that are processed to extract aggregate information about the social interactions. The goal is to ensure that individual users can never be identified from the aggregate information released by the system and prevent the release of any information that could be attributed to individual users.

In accordance with the present invention, user events of a platform are processed to extract aggregate information about users of the platform at an event processing system. A query relating to the user events is received at the system and at least one query parameter (filtering condition) is determined from the query.

Various novel privacy controls are disclosed herein for ensuring that any information released in response to the query cannot be used to identify users individually or be attributed to individual users. These can be used individually or in combination, with various examples described in detail below.

A first aspect of the present invention is directed to a method of processing user events of a platform to extract aggregate information about users of the platform, the method comprising, at an event processing system: receiving a query relating to the user events; determining at least one query parameter from the query; applying to the user events an exact counting procedure for computing an exact count for a set of the user events satisfying the at least one query parameter, by individually identifying and counting those user events; generating error data for the exact counting procedure; using the generated error data to introduce an artificial error in the exact counting procedure, thereby generating an approximate count for the set of user events deviating from the exact count by an unpredictable amount; and responding to the query relating by releasing aggregate information comprising or derived from the approximate count for the set of user events satisfying the at least one query parameter.

The inventors of the present invention have recognized that, where the aggregate information is derived using an exact counting process in which the user events are individually counted (rather than a probabilistic estimation procedure, e.g. based on HyperLogLog or one of its variants), this could open-up the system to a certain type of attack in which it may be possible to identify individual users or infer information about specific users from the released information in certain circumstances. This attack is explained at length below, but for now suffice it to say that the attack is rendered ineffective by deliberately introducing the artificial error into the counting procedure and using the count with this deliberate error as a basis for responding to the query.

In embodiments, the count is a unique user count for the set of user events satisfying the at least one query parameter, or an event count for the set of user events satisfying the at least one query parameter. Alternatively, both the unique user count and the event count may be generated in this manner.

The method may comprise a step of quantizing the approximate count, the aggregate information comprising or derived from the quantized count.

For an inexact unique user count, the method may comprise a step of comparing the inexact user count to a threshold, wherein the aggregate information is released in response to determining that the inexact unique user count is no less than a minimum permitted user count indicated by the threshold.

At least one query parameter may be determined from the query for each of a plurality of buckets. The exact counting procedure may be applied for each of the buckets, with respective error data being generated unpredictably for each of the buckets individually and used to introduce an artificial error in the exact counting process for that bucket to generate an inexact bucket count for each of the buckets, whereby differing artificial errors are exhibited across the bucket counts. That is, to ensure a range of errors across the bucket counts.

The method may comprise a step of quantizing each of the inexact buckets counts for release.

An overall count across all of the buckets may be also generated, corresponding to a sum of all of the buckets counts. This can, for example, be an overall count of all events in an index, or a subset of the events in the index events that satisfy at least one overall query parameter determined from the query (i.e. with two stages of filtering, to isolate events of interest and then provide a breakdown of the results for those events). The exact counting procedure may also be applied to generate an inexact overall count for the user events in the index or the subset of the user events satisfying the at least one overall query parameter, with each of the buckets corresponding to a (further) subset thereof, such that the individual bucket counts provide a breakdown of the overall count.

The bucket counts may be unique user counts, each of which is compared with a bucket redaction threshold, wherein any of the buckets for which the inexact unique user count is below a minimum user count indicated by the bucket redaction threshold is redacted. That is, aggregate information is withheld for that bucket.

The overall count may be an overall unique user count and the method comprises a step of comparing the overall unique user count with a gating threshold to determine whether to accept or reject the query, wherein the query is accepted in response to determining that overall unique user count is at least a minimum user count indicated by the gating threshold.

Each of user events may be purged from the event processing system upon expiry of a retention period for that user event, whereby user events are not counted once purged.

User events for users below an age threshold may not be counted.

Each of the user events may comprise an identifier of one of the platform users and the count may be a unique user count generated from the user identifiers in the set of user events.

The exact counting procedure may comprise computing the exact count for the set of user events satisfying the at least one query parameter, and using the error data to modify the exact count once computed to generate the approximate count deviating from the exact count by the unpredictable amount. For example, the unpredictable amount may be unpredictably selected from a percentage range of the exact count.

Alternatively, the artificial error can be introduced at some other stage(s) of the process, as the count is generated.

A second aspect of the present invention is directed to a method of processing user events of a platform to extract aggregate information about users of the platform, the method comprising, at an event processing system: receiving a query relating to the user events; determining at least one query parameter from the query; computing a unique user count for a set of the user events satisfying the at least one query parameter; comparing the unique user count to a metering threshold; and rejecting the query if the unique user count exceeds a maximum permitted user count indicated by the metering threshold.

This upper limit is a simple and effective way of preventing what is referred to herein as "metering", which refers to the use of broad queries on large, strategic populations of users to infer information about activity on the platform as a whole, such as the total number of social interactions (of any kind) or active users (of any demographic) on a social media platform within a given time period.

In embodiments, the unique user count that is compared to the metering threshold may be estimated from a representative sample of the user events in an index.

If the unique user count does not exceed the maximum permitted user count, the unique user count may be re-computed from a larger number of the user events in the index, e.g. all of the user events in the index.

The re-computed user count may be compared with a gating threshold, and in that event the query is rejected if the re-computed user count is less than a minimum permitted user count indicated by the gating threshold and accepted otherwise.

The metering threshold may be set as a function of a global unique user count for the platform, e.g. as a percentage of the global unique user count for the platform.

The metering threshold may be set in dependence on a statistical analysis of the user events.

A third aspect of the present invention is directed to a method of processing user events of a platform to extract aggregate information about users of the platform, the method comprising, at an event processing system: receiving a query relating the user events; determining at least one query parameter from the query; generating at least one count for a set of the user events satisfying the at least one query parameter; and applying quantization to the at least one count to generate at least one quantized count for release, the quantized count being one of a plurality of permitted quantized values, wherein the quantization has a variable quantization range, the quantization range being the difference between adjacent pairs of the permitted quantized values.

In embodiments, the quantization range may increase for larger permitted quantized values.

For example, the quantization range may increase "linearly" with respect to the permitted quantized values, such that quantization steps scale linearly with audience size (number of unique users). By way of example, a possible set of quantization rules might be as follows:

| audience size for the query | quantization step on each bucket |
| --- | --- |
| <10,000 unique users | round down to the nearest 100th |
| <50,000 unique users | round down to the nearest 500th |
| <100,000 unique users | round down to the nearest 1000th |
| <500,000 unique users | round down to the nearest 5000th. |

Note this is just one example, and the steps may be non-linear (e.g. they may increase quadratically with audience size).

Multiple counts may be generated, and quantization may be applied to all of them.

A fourth aspect of the present invention is directed to a method of processing user events of a platform to extract aggregate information about users of the platform, the method comprising, at an event processing system: receiving a query relating to the user events; determining at least one query parameter from the query; computing a unique user count for a set of the user events satisfying the query parameter; setting a variable gating threshold for the query as a function of the at least one query parameter; comparing the unique user count with the gating threshold set for the query; and rejecting the query if the unique user count is less than a minimum permitted user count indicated by the gating threshold set for the query, whereby the minimum permitted user count depends on the at least one query parameter.

In embodiments, the at least one query parameter may comprise a user attribute, and the variable gating threshold may be set as a function of the user attribute.

A fifth aspect of the present invention is directed to a method of processing user events of a platform to extract aggregate information about users of the platform, the method comprising, at an event processing system: receiving a query relating to the user events; determining at least one query parameter from the query; computing, for a set of the user events satisfying the at least one query parameter, an approximate count with an error margin of at least two percent; applying quantization to the approximate count to generate a quantized count; and responding to the query by releasing aggregate information comprising or derived from the quantized count.

The approximate count ($C_A$) for the set of user events is computed with an error margin (E) of at least 2% in that it deviates from an exact count ($C_E$) for that set by an unpredictable amount (D), wherein D conforms to a probability distribution having a standard deviation ($\sigma$) and the error margin E is defined as follows:

$$E = \frac{\sigma}{C_E} \geq 2\%$$

That is:

$$Pr(D=d)=f(d)$$

where Pr(D=d) is the probability that D=d and f(d) is the probability distribution having standard deviation a that is at least 2% of the exact count $C_E$.

In the context of obtaining counts for user events, this is a significantly larger error than might be expected. However, the inventors of the present invention have recognized that, when combined with quantization, an error of this magnitude ensures that the information released by the system is anonymized. In particular, this combination provides robust protection against a form of "set-balancing attack" that is set out in detail below. To achieve this, an error margin of E between about 2-3% is generally expected to be sufficient.

The error can be an error that is artificially introduced into an exact counting procedure, or it can be error that is intrinsic to a probabilistic count estimation procedure, providing that steps are taken to ensure that this error is of sufficient magnitude. That is, error margin may be a consequence of introducing an artificial error into an exact counting procedure applied to the user event or it may be intrinsic to a probabilistic count estimation procedure applied to the user events to generate the count.

In embodiments, the error margin may be at least three percent.

The quantization may have a quantization range of at least one hundred (for example, the count may be quantized by rounding it down to the nearest one hundred).

Note that, in relation to the first and fifth aspects in particular, the deviation is "unpredictable" in that it would not possible for an external observer to predict what deviation would be introduced for a new given query from the results of different queries submitted to the system, so that the deviation appears random to the external observer. Accordingly, a deviation is considered unpredictable not only when it is indeterministic but also when it is deterministic but unpredictable to users of the system who lack knowledge of how it is created (that is, who lack knowledge of the process used to create it and/or the underlying data to which that process has been applied). For the avoidance of doubt it is noted that the terms "random" and "randomized" are used interchangeably with the term "unpredictable", and as such are not limited to indeterministic behaviour but also encompass behaviour that is deterministic but appears random in this sense.

For example, in accordance with the first aspect of the invention, the error data can be generated in a truly-random sense (e.g. based on quantum-mechanical phenomena, in which case the deviation is unpredictable even with knowledge of how it is determined) but also in a pseudo-random sense, in which case the deviation is unpredictable, and appears random, without knowledge of how it is generated. For example, where the deviation is generated pseudo-randomly by applying an algorithm to a seed, it is unpredictable and therefore appears random without knowledge of the algorithm and the seed. (It is also noted, for the avoidance of doubt that, the extent of the deviation that has been introduced for any given query may not even be derivable from the information released from the system due to the quantization).

In any of the above, the platform may be a content publication platform for publishing and consuming content, the user events relating to the publication and consumption of content by the users of the content publishing platform.

However, it is noted that whilst the "user events" referred to herein can relate to social interactions on a social media platform (publishing/consuming content), the invention is not limited to this and the system can be used for processing other types of events. The platform can be any platform with a user base that facilitates user actions. The platform provider could for example be a telecoms operator like Vodafone or Verizon, a car-hire/ride-share platform like Uber, an online market place like Amazon, a platform for managing medical records. The events can for example be records of calls, car rides, financial transactions, changes to medical records etc. conducted, arranged or performed via the platform. There are numerous scenarios in which it is beneficial to extract anonymous and aggregated information from such events, where the need to obtain a count, such as a unique user count or event count, over a set of such events arises.

In this respect, it is noted that all description pertaining to interaction events of a social media platform (content items) herein applies equally to other types of events of platforms other than social media. Each user event can be any event relating to the user with which it is associated. Each of the user events may relate to an action performed by or otherwise relating to one of the users of the platform and comprise an identifier of that user. That is, each of the user events may be a record of a user-related action on the platform.

Such events can comprise or be associated with user attributes and/or metadata for the actions to which they relate, allowing those events to be processed (e.g. filtered and/or aggregated) using any of the techniques described herein, for example to count the number of events satisfying a filter (e.g. at least one query parameter defined in or derived from a query) and the number of unique users across those events.

Another aspect of the present invention is directed to an event processing system comprising computer storage holding executable instructions and one or more processing units configured to execute those instructions to carry out any of the method steps or system functionality disclosed herein.

Another aspect of the present invention is directed to a computer program product comprising executable instructions stored on a computer readable storage medium and configured, when executed at an event processing system, to carry out any of the method steps or system functionality disclosed herein.

BRIEF DESCRIPTION OF FIGURES

For a better understanding of the present invention, and to show how embodiments of the same may be carried into effect, reference is made by way of example to the following figures in which.

DETAILED DESCRIPTION OF EMBODIMENTS

Figure 1A:
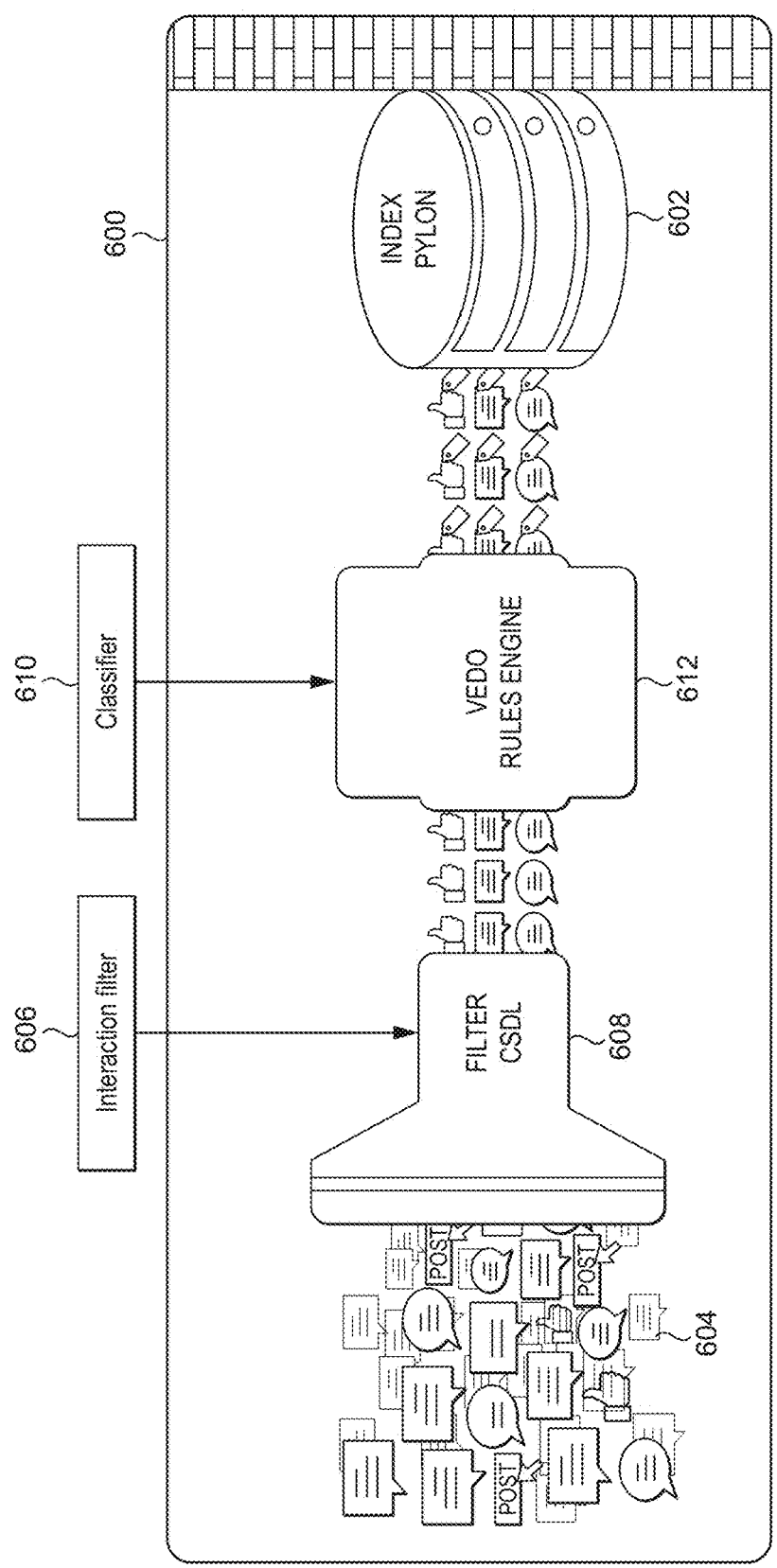
FIG. 1A shows a schematic block diagram of an index builder of a content processing system.

FIG. 1A shows a high level overview of part of a content processing system for processing content items 604 of a social media platform.

Each of the content items 604—also called "interaction events" or simply "events" herein—is a record of an "interaction" on the social media platform (social interaction), which can be a social media user publishing a new piece of content or consuming an existing piece of content. Examples of different publishing or consuming actions are given later. The events are provided by the social media platform, which is referred to as a "data provider" in this context. They are provided as a real-time data stream or multiple real-time data streams (e.g. different streams for different types of events), also referred to as "firehoses" herein. That is, the events 604 are received in real-time at an index builder 600 of the content processing system as the corresponding social interactions take place.

Indexes, such as index 602, can be created within the index builder 600. An index is a database in which selectively-made copies of the events 602 are stored for processing. An index can for example be a bespoke database created by a querying user for his own use, i.e. a user of the content processing system who wishes to submit queries to it (such as a customer), or it can be a shared index created by an operator of the content processing system for use by multiple customers. The index 602 holds copies of selected events 604, which are selected by a filtering component 608 of the index builder 600 according to specified filtering rules. These filtering rules are defined in what is referred to herein as an "interaction filter" 606 for the index 602. Viewed in slightly different terms, an index can be seen as a partial copy of a global database (the global database being the set of all events received from the data provider) that is populated by creating copies of the events 604 that match the interaction filter 606.

The index 602 can be created in a "recording" process, which is initialized by providing an interaction filter 606 and which runs from a timing of the initialization to capture events from that point onwards as they occur in real-time. It may also be possible for an index to contain historical events. The interaction filter 608 is applied by the filtering component 608 in order to capture events matching the interaction filter 606, from the firehoses, as those events become available. The process is a real-time process in the sense that it takes as an input the "live" firehoses from the data provider and captures the matching events in real-time as new social interactions occur on the social media platform. The recording process continues to run until the customer 606 (in the case of a bespoke index) or service provider (in the case of a shared index) chooses to suspend it, or it may be suspended automatically in some cases, for example when system limits imposed on the customer are breached.

Each of the events 604 comprises a user identifier of the social media user who has performed the corresponding interaction. As explained in further detail later, by the time the events 604 arrive at the filtering component 608, preferably every one of the events comprises a copy of the content to which it relates; certain "raw" events, i.e. as provided by the data provider, may not include the actual content when first provided, in which case this can be obtained and added in an "augmentation" stage of the content processing system, in which "context building" is performed.

User attributes of the social media users are made available by the data provider from user data of the social media platform, for example from the social media users' social media accounts (in a privacy-sensitive manner—see below). A distinguishing characteristic of such user attributes is that they are self-declared, i.e. the social media users have declared those attributes themselves (in contrast to user attributes that need to be inferred from, say, the content itself). The attributes be provided separately from the raw events representing the publication and consumption of content from the data provider. For example, an attribute firehose may be provided that conveys the creation or modification of social media profiles in real-time. In that case, as part of the context building, the events 604 relating to the publication and consumption of content can be augmented with user attributes from the attribute firehose, such that each of the augmented events 604 comprises a copy of a set of user attributes for the social media user who has performed the interaction.

The idea behind context building is to add context to events that lack it in some respect. For example, a user identifier (ID) in an incoming event may simply be an anonymized token (to preserve user privacy) that has no meaning in isolation; by adding user attributes association. In database terminology, context building can be viewed a form of de-normalization (vertical joining). Another example when a data provider provides a separate firehoses of "likes" or other engagements with previous events.

The customer or service provider is not limited to simply setting the parameters of his interaction filter 606; he is also free to set rules by which the filtered events are classified, by a classification component 612 of the index builder 600. That is, the customer/service provider has the option to create a classifier 610 defining classification rules for generating and attaching metadata to the events before they are stored in the index 602. These classification rules can, for example, be default or library rules provided via an API of the content processing system, or they can be rules which the customer or service codes himself for a particular application.

Individual pieces of metadata attached to the events 604 are referred to herein as "tags". Tags can include for example topic indicators, sentiment indicators (e.g. indicating positive, negative or neutral sentiment towards a certain topic), numerical scores etc., which the customer or service provider is free to define as desired. They could for example be rules based on simple keyword classification (e.g. classifying certain keywords as relating to certain topics or expressing positive sentiment when they appear in a piece of content; or attributing positive scores to certain keywords and negative scores to other keywords and setting a rule to combine the individual scores across a piece of content to give an overall score) or using more advanced machine learning processing, for example natural language recognition to recognize sentiments, intents etc. expressed in natural language or image recognition to recognize certain brands, items etc. in image data of the content. The process of adding metadata tags to events, derived from the content to which they relate, is referred to as "enrichment" below.

In addition to bespoke tags added through enrichment, the events may already have some tags when they are received in the firehoses, for example time stamps indicating timings of the corresponding interactions, geolocation data etc.

With the (additional) tags attached to them in this manner according to the customer's bespoke definitions, the filtered and enriched events are stored in the index 602, populating it over time as more and more events matching the interaction filter 608 are received.

Multiple indexes can be created in this manner, tailored to different applications in whatever manner the service provider/customers desire.

It is important to note that, in the case of private social media data in particular, even when the customer has created the index 602 using his own rules, and it is held in the content processing system on his behalf, he is never permitted direct access to it. Rather, he is only permitted to run controlled queries on the index 602, which return aggregate information, derived from its contents, relating to the publication and/or consumption of content on the content publication platform. The aggregate information released by the content sharing system is anonymized i.e. formulated and released in a way that makes it impossible to identify individual social media users. This is achieved in part in the way the information is compiled based on interaction and unique user counts (see below) and in part by redacting information relating to only a small number of users (e.g. less than one hundred).

Queries are discussed in greater detail below but for now suffice it to say that two fundamental building blocks for the anonymized aggregate information are:

1) interaction counts, and
2) associated unique user counts.

These counts can be generated either for the index 602 as a whole or (in the majority of cases) for a defined subset of the events in the index 602, isolated by performing further filtering of the events held in the index 602 according to "query filters" as they are referred to herein. Taken together, these convey the number of interactions per unique user for the (sub)set of events in question, which is a powerful measure of overall user behaviour for the (sub)set of events in question.

The interaction count is simply the number of events in the index 306 or subset, and the unique user count is the number of unique users across those events. That is, for a query on the whole index 602, the number of events that satisfy (match) the index's interaction filter 606 and the number of unique social media users who collectively performed the corresponding interactions; for a query on a subset of the index 602 defined by a query filter(s), the interaction count is the number of events that also match that query filter(s) (e.g. 606a, 606b, FIG. 1B—see below) and the number of unique social media users who collectively performed the corresponding subset of interactions. Successive query filters can be applied, for example, to isolate a particular user demographic or a particular set of topics and then breakdown those results into "buckets". Note, this does not mean successive queries have to be submitted necessarily; a single query can request a breakdown or breakdowns of results, and the layers of filtering needed to provide this breakdown can all be performed in response to that query. For example, results for a demographic defined in terms of gender and country could be broken down as a time series (each bucket being a time interval), or in a frequency distribution according to gender, most popular topics etc. These results can be rendered graphically on user interface, such as a dashboard, in an intuitive manner. This is described in greater detail later.

For example, to aggregate by gender (one of "Male", "Female", "Unknown") and age range (one of "18-25", "25-35", "35-45", "45-55", "55+"), in the response to an aggregation query (unique user and interaction) counts may be generated for each of the following buckets:

| Bucket |
| --- |
| Male, 18-25 |
| Male, 25-35 |
| Male, 35-45 |
| Male, 45-55 |
| Male, 55+ |
| Female, 18-25 |
| Female, 25-35 |
| Female, 35-45 |
| . . . |
| Unknown, 55+ |

Despite their simplicity, these fundamental building blocks are extremely powerful, particularly when coupled with the user attributes and bespoke metadata tags in the enriched events in the index 602. For example, by generating interaction and user counts for different subsets of events in the index 602, which are isolated by filtering according to different combinations of user attributes and tags, it is possible for an external customer to extract extremely rich information about, say, the specific likes and dislikes of highly targeted user demographics (based on the social interactions exhibited across those demographics) or the most popular topics across the index or subset thereof, without ever having to permit the external customer direct access to the index 602 itself.

For example, a useful concept when it comes to identifying trends within particular user demographics is the concept of "over-indexing". This is the notion that a particular demographic is exhibiting more interactions of a certain type than average. This is very useful when it comes to isolating behaviour that is actually specific to a particular demographic. For example, it might be that within a demographic, a certain topic is seeing a markedly larger number of interactions per unique user than other topic (suggesting that users are publishing or consuming content relating to that topic more frequently). However, it might simply be that this is a very popular topic, and that other demographics are also seeing similar numbers of interactions per unique user. As such, this conveys nothing specific about the target demographic itself. However, where, say, a topic is over-indexing for a target user demographic, i.e. seeing a greater number of interactions per unique user across the target demographic than the number of interactions per unique user across a wider demographic, then that coveys information that is specific to the target demographic in question.

Figure 1B:
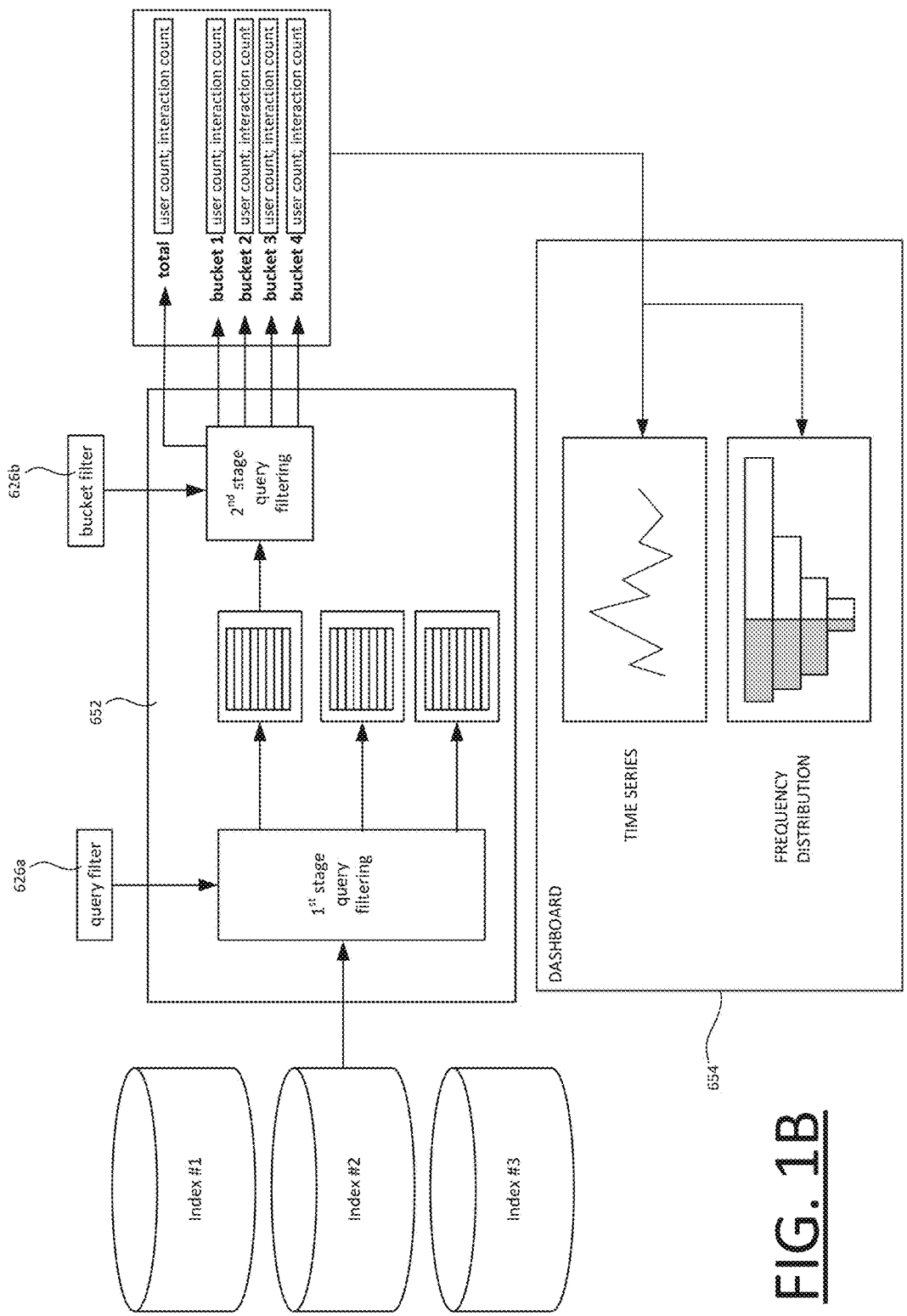
FIG. 1B shows a schematic block diagram of a real-time filtering and aggregation component of a content processing system.

By way of example, FIG. 1B shows a real-time filtering and aggregation component 652 of the content processing system implementing steps to respond to a query with two stages of filtering to give a breakdown in response to that query.

In the first stage of filtering 654a, a first query filter 626a is applied to the index 602 (shown as one of multiple indexes) to isolate a subset of events 656 that match the first query filter 626a. The first query filter 626a can for example be defined explicitly in the query by the customer, in order to isolate a particular demographic(s) of users of a particular topic(s) (or a combination of both) that is of interest to him.

In the second state of filtering 654b, second query filters 262b (bucket filters) are applied to the subset of events 656. Each of the bucket filters is applied to isolate the events in the subset 656 that satisfy that bucket filter, i.e. the events in a corresponding bucket, so that total interaction and user counts can be computed for that bucket. The total user and interaction counts for each bucket (labelled 656.1-4 for buckets 1-4 in this example) are included, along with total user and interaction counts for the subset of events 656 as a whole, in a set of results 660 returned in response to the query. The results 660 are shown rendered in a graphical form on a user interface, which is a dashboard 654. That is, the result 660 is represented as graphical information displayed on a display to the customer. The underlying set of results 660 can also be provided to the customer, for example in a JSON format, so that he can apply his own processing to them easily.

Multiple subsets can be isolated in this way at the first stage filtering 626a, and each can be broken down into buckets as desired at the second stage 626b.

The buckets can for example be time based, i.e. with each bucket containing events in the subset 656 within a different time interval. These are shown rendered on the dashboard 654 as a graphical time series 655a, with time along the x-axis and the counts or a measure derived from the counts (such as number of interactions per unique user) on the y-axis, which is a convenient and intuitive way of representing the breakdown according to time. As another example, the buckets could be topic based (e.g. to provide a breakdown of the most popular topics in the subset 656) or user based (e.g. to provide a breakdown according to age, gender, location, job function etc.), or a combination of both. In this case, it may be convenient to represent the results as a frequency distribution or histogram 655b, to allow easy comparison between the counts or a measure derived from the counts (e.g. interactions per user) for different buckets. As will be appreciated, these are just examples, and it possible to represent the results for the different buckets in different ways that may be more convenient in some contexts. The information for each bucket can be displayed alongside the equivalent information for the subset 656 as a whole for comparison, for example by displaying on the dashboard 654 the total user and interaction counts or the total number of interactions per unique user across the subset 656 as a whole etc. The dashboard 654 can for example provided as part of a Web interface accessible to the customer via the Internet.

Figure 2:
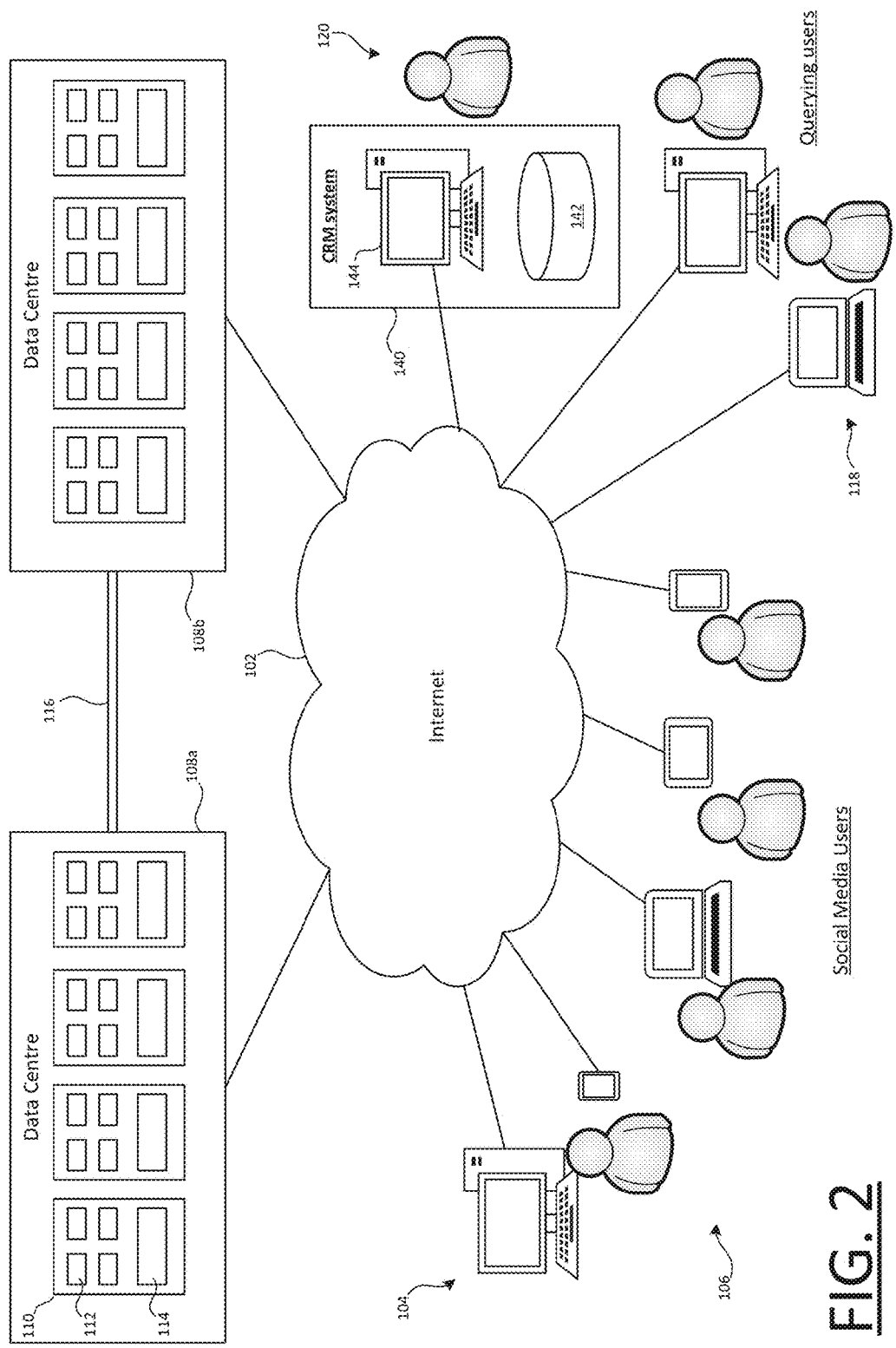
FIG. 2 shows a schematic block diagram of a computer system in which a content processing system can be implemented.

FIG. 2 shows a schematic block diagram of a computer system in which various devices are connected to a computer network 102 such as the Internet. These include user devices 104 connected to the network 102 and which are operated by users 106 of a social media platform.

The term "social media platform" refers herein to a content publication platform, such as a social network, that allows the social media users 106 to interact socially via the social media platform, by publishing content for consumption by other social media users 106, and consume content that other social media users 106 have published. A social media platform can have a very large number of users 106 who are socially interacting in this manner—tens of thousands or more with the largest social media platform today currently having user bases approaching 2 billion users. The published content can have a variety of formats, with text, image and video data being some of the most common forms. A piece of published content can be "public" in the sense that it is accessible to any user 106 of the social media platform (in some cases an account within the social media platform may be needed, and in others it may be accessible to any Web user), or it can be "private" where it is rendered accessible to only a limited subset of the social media users 106, such as the sharing user's friends. That is, private content is rendered accessible to only a limited audience selected by the user publishing it. Friendships and other relationships between the users 106 of the social media platform can be embodied in a social graph of the social media platform, which is a computer-implemented data structure representing those relationships in a computer readable format. Typically, a social media platform can be accessed from a variety of different user devices 104, such as smart phones, tablets and other smart devices, or other general purpose computing devices such as laptop or desktop computers. This can be via a web browser or alternatively a dedicated application (app) for the social media platform in question. Examples of social media platforms included LinkedIn, Facebook, Twitter, Tumblr etc.

Social media users 106 can publish content on the social media platform by generating new content on the platform such as status updates, posts etc., or by publishing links to external content, such as articles etc. They can consume pieces of content published by other social media users 106 for example by liking, re-sharing, commenting on, clicking on or otherwise engaging with that content, or simply having that content displayed to them without actively engaging with it, for example in a news feed etc. (that is, displaying a piece of content to a social media user is considered a consuming act in itself in some contexts, for which an interaction event is created, as it is assumed the user has seen the displayed content). That is, the term "consumption" can cover both active consumption, where it is evident the user has made a deliberate choice to consume a specific piece of content, and passive consumption, where all that is known is that a specific piece of content has been rendered available to a user and it is assumed he has consumed it.

To implement the social media system, a back-end infrastructure in the form of at least one data centre is provided. By way of example FIG. 2 shows first and second data centres 108a, 108b connected to the network 102, however as will be appreciated this is just an example. Large social media systems in particular may be implemented by a large number of data centres geographically distributed throughout the world. Each of the data centres 108a, 108b is shown to comprise a plurality of servers 110. Each of the servers 110 is a physical computing device comprising at least one processing unit 112 (e.g. CPU), and electronic storage 114 (memory) accessible thereto. An individual server 110 can comprise multiple processing units 112; for example around fifty. An individual data centre can contain tens, hundreds or even thousands of such servers 110 in order to provide the very significant processing and memory resources required to handle the large number of social interactions between the social media users 106 via the social media platform. In order to publish new content and consume existing content, the user devices 104 communicate with the data centres 108a, 108b via the network 102. Within each of the data centres 108a, 108b, data can be communicated between different servers 110 via an internal network infrastructure of that datacentre (not shown). Communication between different data centres 108a, 108b, where necessary, can take place via the network 102 or via a dedicated backbone 116 connecting the data centres directly. Those skilled in the art will be familiar with the technology of social media and its possible implementations so further details of this will not be described herein.

The frequent and varied social interactions between a potentially very large number of social media users 106 contains a vast array of information that is valuable in many different contexts. However processing that content to extract information that is meaningful and relevant to a particular query presents various challenges.

The described embodiments of the present invention provide a content processing system which processes events of the kind described above in order to respond to queries from querying users 120 with targeted information relevant to those queries, in the manner outlined above. The querying users 120 operate computer devices 118 at which they can generate such queries and submit them to the content processing system.

A data processing system 200 comprising the content processing system 202 will now be described with reference to FIG. 3, which a schematic block diagram for the system 300.

The content processing system 202 is shown to comprise a content manager 204, and attribute manager 206, a content processing component 208 and a query handler 210. The content manager 204, attribute manager 206, content processing component 208 and query handler 210 of the content processing system 202 are functional components, representing different high level functions implemented within the content processing system 202.

At the hardware level, the content processing system 202 can be implemented in the data centres 108a, 108b of the social media system back end itself (or in at least one of those data centres). That is, by content processing code modules stored in the electronic storage 114 and executed on the processing units 112. Computer readable instructions of the content processing code modules are fetched from the electronic storage 114 by the processing units 112 for execution on the processing units 112 so as to carry out the functionality of the content processing system 202 described herein. Implementing the content processing system 202 in the social media data centres 108a, 108b themselves is generally more efficient, and also provides a greater level of privacy and security for the social media users 106, as will become apparent in view of the following. However, it is also viable to implement it in a separate data centre (particularly when only public content is being processed) that receives a firehose(s) from the social media platform via the Internet 102.

As explained below, the content manager 204 and attribute manager 206 form part of a privatization stage 210a of the content processing system 202. They co-operate so as to provide an internal layer of privacy for social media users by removing all user-identity from the events and user attributes before they are passed to the content processing component 208. The content processing component 208 and query handler 210 constitute a content processing stage 210b of the content processing system 202, at which events and attributes are processed without ever having access to the users' underlying identities in the social media platform. This privatization is particularly important for private content.

The steps taken to remove the user-identity can be seen as a form of anonymization. However, for the avoidance of doubt, it is noted that removing the user-identity does not fully anonymize the events 212 or user data, as it may still be possible to identify individual users through careful analysis based on their attributes and behaviour. For this reason, the anonymized events and user data are never released by the content processing system 202, and the additional anonymization steps outlined above are taken on top of the removal of the user identity to ensure that individual users can never be identified from the aggregate information released by the system 202.

To implement the privatization, the content manager 204 receives events 212 of the social media platform where, as noted, each of the events 212 represents a social interaction that has occurred on the social media platform and comprises a user identifier 214 of one of the social media users 106 who performed that interaction. That is, the user who published or consumed the piece of content to which the event relates. The user identifiers 214 in the events 212 constitute public identities of the social media users 106. For example, these can be user names, handles or other identifiers that are visible or otherwise accessible to other social media users 106 who can access the published content in question. As part of the privatization stage 210a, the content manager modifies the events 212 to replace the public identifiers 214 with corresponding anonymized user identifiers 224 in the modified events 222, which can for example be randomly generated tokens. Within the content processing stage 210b, the anonymized tokens 224 act as substitutes for the public identifiers 214. The content manager 204 replaces the public identifiers 214 with the anonymous tokens 224 in a consistent fashion, such that there is a one-to-one relationship between the public identifiers 214 and the corresponding tokens 224. However, the public identifiers 214 themselves are not rendered accessible to the content processing stage 210b at any point.

Beyond the fact that these anonymized identifiers 224 allow each user's events to be linked together, these anonymized tokens 224 do not convey any information about the identity of the social media users 106 themselves.

As such, an important function of the attribute manager 206 is one of generating what are referred to herein as "anonymized user descriptions" 240. Each anonymized user description 240 comprises a set of attributes for one of the social media users 106 and is associated with the anonymized user identifier 224 for that user. In the example of FIG. 3B, each of the anonymized user descriptions 240 comprises a copy of the anonymized user identifier 224 and is provided to the content processing component 208 separately from the modified events 222. This in turn allows the content processing component 208 to link individual events 222 with the attributes for the user in question by matching the anonymized tokens in the anonymized user descriptions 240 to those in the events 224, and augmenting those events with those attributes. The user descriptions 240 can be updated as the user attributes change, or as new user information becomes available, for incorporation in subsequent events. Alternatively, the user attributes could instead be provided to the content processing component 208 as part of the events 222 themselves.

The attribute manager 206 can determine the user attributes 226 for the anonymized user descriptions 240 from user data 242 of the social media system itself. For example, the user data that forms part of the social media user's accounts within the social media system. The social media user data 242 can for example comprise basic demographic information such as gender, age etc. From this, the attribute manager 206 can determine basic user attributes such as gender attributes, age (or age range) attributes etc.

User attributes determined from the user data 242 of the social media system itself are referred to herein as a first type of user attribute or, equivalently, "native" attributes (being native to the social media platform itself). The attribute manager 206 may also be able to determine user attributes of other types in certain circumstances, from other sources of data.

The query handler 210 handles incoming queries submitted to the content processing system 202 by the querying users 120. These queries are essentially requests for aggregate information relating to the publication and/or consumption of content within the social media system. As noted, this may involve applying a querying filter(s) where, in general, a querying filter can be defined in terms of any desired combination of user attributes 226 and/or tags. The content processing component 208 filters the events 222 to filter out any events that do not match the querying filter.

The basic elements of a query essentially fall into one of two categories: elements that specify user demographics (in terms of user attributes); and elements that specify particular content (in terms of tags). For the former, the aim is to filter out events 222 for users outside of the desired demographic (filtering by user attribute). For the latter, the aim is to filter out events that are not relevant to the specific tags, (filtering by metadata).

For example, for a query defined in terms of one or more user attributes and one or more tags (see above), the content processing component 208 filters out any events 222 for users without those attributes and any events 222 that do not match those tags, leaving only the events for users having those attributes and which also match those tags. From the filtered events (i.e. the remaining events) the content processing component 208 can extract the desired aggregate and anonymized information.

As will be appreciated, this is a relatively simple example presented for the purposes of illustration and it is of course possible to build more a complex queries and to return results with more detailed information. For example, a general query for any popular topics for a specified demographic of users (as defined by set of attributes) may return as a result one or more popular topics together with a number of unique users in that demographic and who been engaging with that topic. As another example general query requesting information about which demographics a specified topic is popular with may return a set of user attributes and a number of unique users having those attributes and who have engaged with that topic recently. Here, the concept mentioned above of over-indexing becomes pertinent: for example, the response to the query may identify demographics (in terms of attributes) for which the topic is over-indexing, i.e. indicating that this topic is not merely popular within that demographic but more popular than the average across all demographics (or at least a wider demographic).

As noted, certain types of tag, such as topic, can be generated by processing the pieces of published content 216 themselves, for example using natural language processing in the case of text and image recognition in the case of static images or video. This enrichment can be performed before or after the user-identities have been stripped out (or both).

Queries submitted to the content processing system 202 are handled and responded to in real time, where real time in this particular context means that there is only a short delay of two seconds or less between the query being received at the content processing system 202 and the content processing system 202 returning a result. The filtering needed to respond to the query is performed by the content processing component 208 in response to the submission of the query itself. That is, the content processing component 208 performs the filtering in real-time when the query is received. Any pre-processing or enrichment of the events need not be performed in real time, and can for example be performed as the events are received at the relevant part of the system.

Once the events 222 have been filtered as needed to respond to the query in question, the content process component 208 extracts, from the filtered events in real-time, anonymized, aggregate information about social interactions on the social media platform. That is, aggregate information about the publication and/or consumption of content by the social media users 106.

As will be apparent, new events 212 will be constantly generated as the content processing system 202 is in use. For example, for popular social media platforms, hundreds of thousands of new events may be generated every minute as users frequently publish new content or consume existing content. To handle the large volume of data, the resulting anonymized events 222 are only retained at the anonymized content processing stage 210b for a limited interval of time, for example 30 days or so. In that case, the result returned in response to a query relates to activity within the social media platform within that time interval only.

Alternatively, rather than a blanket retention rule of this nature, the amount of time for which events 222 are retained may be dependent on the events themselves. For example events relating to more popular content may be retained for longer. This allows older information for more popular content to be released upon request.

Figure 3:
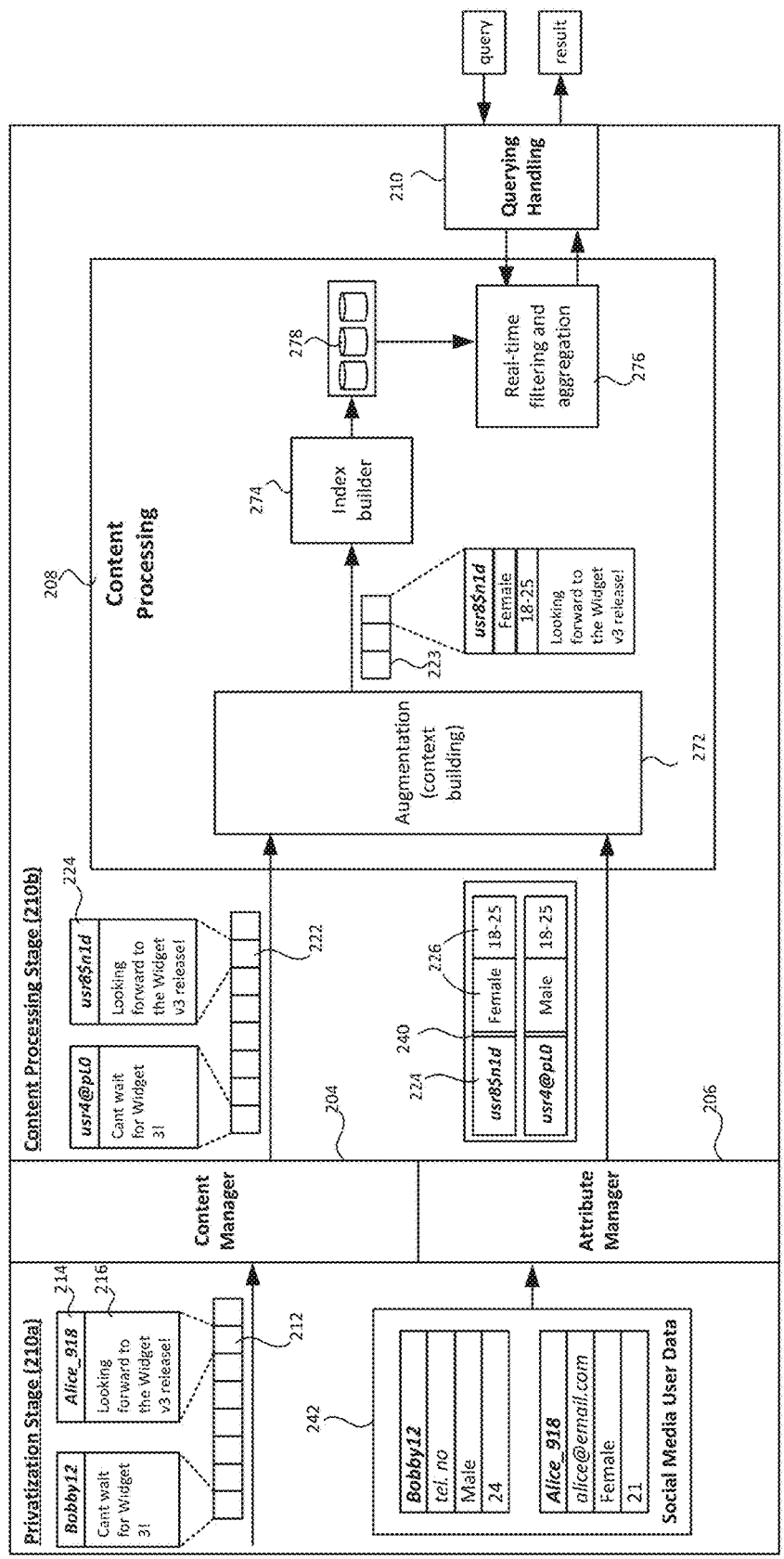
FIG. 3 shows a block diagram of a content processing system in accordance with the present invention.

FIG. 3 also shows details of the content processing component 210 in one embodiment of the present invention. The content processing component is shown to comprise an augmentation component 272, which receives the events 222 and the user descriptions 224. These can for example be received in separate firehoses. The augmentation component augments the events 224 with the user attributes 226. That is, for every one of the events 222, the augmentation component adds, to that event 222, a copy of the user attributes associated with the user identifier in that event 222. The augmented events 223 are passed to an index builder 274, which corresponds to the index builder 600 in FIG. 1A and operates as described above to create indexes 278 populated with selected and enriched ones of the augmented events 223. The indexes 278 are rendered accessible to a real-time filtering and aggregation component 276 of the content processing component 210, which operates as described above with reference to FIG. 1B in order to filter and aggregate events in the index in real-time as and when it is instructed to do so by the query handler 210. The indexes 278 and filtering and aggregation component 276 are also shown in FIG. 3A. Events 223 are purged from the indexes 278 in accordance with the retention policy.

As indicated above, whilst the privatization stage 210a is particularly important for private content, it is not essential, and can in particular be omitted for public content in some contexts. In that case, the above techniques can be applied to the original events 212 items directly, using the public identifiers 214 in place of the anonymized identifiers 224.

An architecture for the content processing system 202 that is preferred in some contexts is described below with reference to FIG. 4, but first some of the considerations that led to this architecture are explained.

There are various contexts in which it is desirable to compute a number of unique users across a set of data selected for a specific query. For example, for a query requesting a breakdown into multiple buckets, a count for each bucket as described above.

In most indexing systems that are currently used to process large amounts of time-dependent data, events are organised by time. For example, events may be "sharded" (horizontally partitioned) on multiple nodes, such as database servers, according to time. This is a natural way of sharding time dependent events, such as the events in the incoming firehoses from a data provider.

With time-centred sharding, a memory-efficient way of obtaining an approximate unique user count across many nodes is to use a probabilistic data structure, such as HyperLogLog++. In addition to being space-efficient, the HyperLogLog (HLL) data structure has a convenient property that an object computed on one node can be merged with an object being computed on another node, and the resulting HLL object still gives a good approximation of the number of distinct authors across the two (or more) nodes; that is, the error rate remains low and isn't compounded by merging multiple objects together.

In the present context, even in a single query, the need can arise to retrieve information that is broken down into potentially thousands of buckets. As an example, it may be desirable to filter events in the index 278 on people in a certain age range and country, and return the counts of people broken down into buckets by their industry by applying additional filtering on top of this, for example by their job function, by the top articles shared by each industry job function etc. With HLL, generating a response to a single query of this nature might need thousands of HLL objects to be generated. Moreover, a single user can run multiple queries at once, and on top of that there can be multiple users using the system simultaneously, which means the overall memory requirements to handle HLL objects on each node for all querying users (and transfer them over the network to merge them for each query) become very significant.

In contrast to the time-centred indexing systems of the kind described above, the content processing system 202 of FIG. 4 has a user-centred indexing architecture that allows a count of unique users across a set of events that match a filter to be determined very quickly and with reduced memory requirements. The count is obtained with greater efficiency than HLL, both in terms of memory usage and speed of computation. In the main embodiment described below, HLL objects are not utilised, and in contrast to HLL, an exact count is produced. However an alternative embodiment is described wherein HLL objects are utilised and the count is an estimate.

This increased efficiency is achieved by changing the way the data is laid out on disk and distributed on the various nodes of a cluster.

Rather than grouping events according to time, they are grouped according to user: the idea being to allocate all of the events for a certain user to the same node, for processing on that node, and to store it in local storage at that node contiguously, i.e. so that events for different users are never intertwined in the local storage. This way, to compute the unique number of users for a certain query, it is sufficient to simply count the boundaries between different users who satisfy an applied filter, without any requirement to store a record of all the user IDs encountered so far (which would otherwise be needed to keep track of which users have already been counted). Moreover, because all the data for a given user is sent to the same node, it's also safe to sum the unique counts across all nodes, without any risk of users being "double-counted" (i.e. the same user being counted more than once).

As noted above, the unique user count is one of the fundamental pieces of information that may be released by the content processing system 202, and the present techniques allow it to be extracted quickly for prompt release in response to a query. The unique user count is also highly pertinent to privacy policy aspects: as noted, to maintain privacy for the social media users 106, it is desirable to impose privacy policies which constrain when such information can be released. In particular, the release of information for any given bucket may only be released when the total number of unique users across that bucket exceeds a minimum threshold, and redacted if the threshold is not met. That is, for any given query, the privacy policies need to be satisfied by each one of the corresponding buckets. With the present techniques, user counts can be generated extremely quickly for each bucket, allowing a very fast check to be performed on each bucket of whether it is necessary to apply redactions to that bucket. Accordingly, with this user-centred architecture, queries can be responded to, and strong privacy constraints can be guaranteed, with greater efficiency than HLL.

Maintaining data grouped by user can be achieved by routing the data by user to a designated node for a range of users, and implementing a "staged" merging at each node, in which new data (new events) is temporarily "parked" (i.e. temporarily stored) in a "staging area" (queue) of that node, and implementing a periodic process to sort the new data and merge it with the existing events already at that node.

Figure 4:
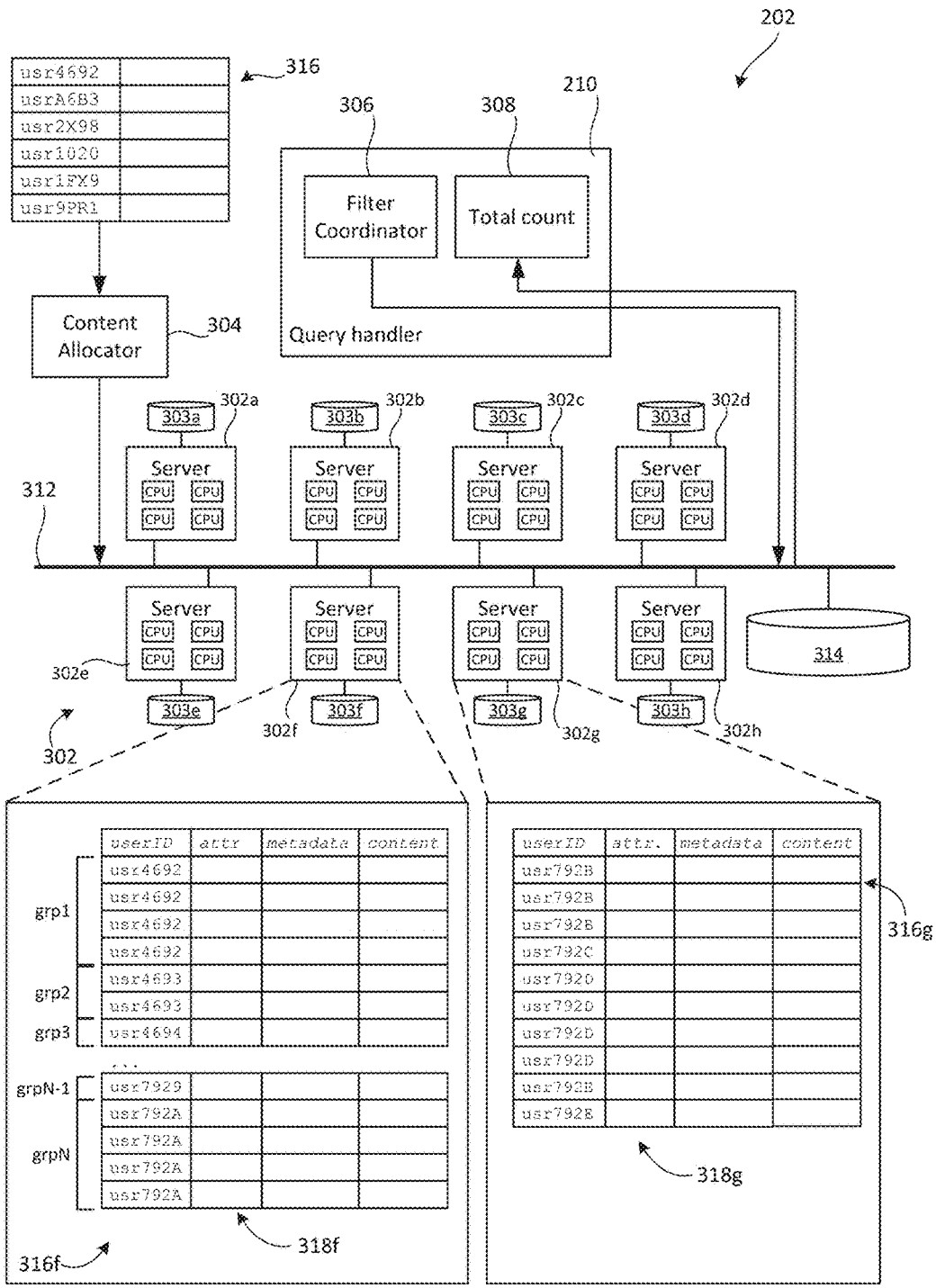
FIG. 4 shows an example of a user-centred for a content processing system.

FIG. 4 shows a schematic block diagram of the content processing system 202 having the user-centred architecture, which is shown to comprise a plurality of processing nodes 302 ("content processors"). The nodes 302 are processing devices, each comprising at least one and preferably multiple processing units such as CPUs. That is, the processing nodes 302 are computer devices, such as servers. A processing unit can be for example a single-core processor or an individual core of a multi-core processor. In any event, each of the processing units is a physical unit that can execute content processing code, by fetching instructions of the content processing code from memory accessible to that processing unit and carrying out those instructions, simultaneously with the other processing units in the same content processing server to carry out parallel processing within that server. Moreover, each of the nodes 302 can perform such processing simultaneously with the other nodes 302 to perform parallel processing, across the nodes 302, of incoming events 316 received at the content processing system 202 in the firehose(s), such as the anonymized events 222 of FIG. 2.

Eight individual nodes 302*a-h* are shown in FIG. 4, but in practice it is expected that more processing nodes may be used in practice to handle the large amount of content published and consumed on popular social media platforms. The nodes 302 cooperate to implement the real-time filtering and aggregation component 276 of FIG. 3, in order to filter and count events efficiently.

The nodes 302 of FIG. 4 are servers located in a data centre, and can for example be a set of the servers 110 in one of the data centres 108*a*, 108*b* of the social media platform itself. The data centre has an internal network 312, provided by an internal, high-speed network infrastructure of the data centre, via which the nodes 302 can communicate with other components of the content processing system 202.

Each of the nodes 302 has access to its own local computer storage (that is, local to that node), in which it can store and modify data to carry out its content processing functions, labelled 303*a-h* for nodes 302*a-h* respectively. This can comprise volatile and/or non-volatile memory, for example solid-state or magnetic storage (or a combination of both). The term "disk" is sometimes used as short-hand for the local storage at a node, though it will be appreciated that this term does not necessarily imply traditional rotating-disk storage and also covers solid-state storage (for example).

The nodes 302 may also have access to shared computer storage 314; that is, shared between two or more of the nodes 312 and accessible via the internal network 312 of the data centre. This can be located in the data centre itself, or it may be external and accessed via an external connection connected to the internal network 312 (or a combination of both).

As well as the content processing code executed on the nodes 302 of content processing system 202, control code is also executed within the content processing system 202. The control code coordinates the content processing across the nodes 302, via the internal network 312, to ensure that it is conducted in an efficient and reliable manner. This can be executed at one of the nodes 302 or at a separate computer device of the data centre, or at multiple such devices in a distributed fashion provided it is in a manner that permits it overall visibility and control of the nodes 302.

In this respect, the content processing system 202 is shown to comprise a content allocator 304, a filter coordinator 306 and a total count generator 308. These are functional components of the content processing system 202, representing different high-level functions implemented by the control code when executed within the content processing system 202. The components 304-308 are shown connected to the internal network 312, to represent the fact that the signalling within the data centre needed to coordinate these functions takes place via the local network 312.

As indicated, a key feature of the content processing system 202 of FIG. 4 is that incoming events 316 representing social interactions on the social media platform—that is, social media users publishing new content or consuming existing content—are allocated to individual nodes 302 for processing based on the user IDs in those events, such that all events with the matching user IDs (i.e. corresponding to the same social media user) are allocated to the same node. That is, each event representing an interaction is allocated based on the (anonymized) identity of the user who performed that interaction. That is, each unique user identifier for the social media platform is assigned to exactly one of the nodes 302, and that one node is responsible for filtering and aggregating all events associated with that unique identifier.

Note that, in the present context, a user identifier is assigned to exactly one node in the sense that all events for that user (corresponding to all of the social interactions performed by that user) are allocated to that node, and that node alone is responsible for filtering and aggregating those events (to generate local interaction and user counts—see below) in carrying out the real-time filtering and aggregation functionality of the system (that is, component 276 in FIG. 3). It does not exclude the possibility of making additional copies of the events and/or applying additional processing to those events elsewhere in the system for other purposes, for example as part of a backup function.

The users can be assigned to nodes by using user IDs according to an ordering function described below. However other techniques are possible, for example the distribution strategy of users onto different nodes might be based on a hash of the user ID, rather than the user ID itself. Moreover there is no implicit ordering requirement between different groups of users, besides the fact that the users are grouped. Most importantly, the events for any particular user are always processed at the same node.

It can be convenient for each node to be assigned a range of user identifiers within the set of existing user identifiers U. In mathematical terms, an ordered set of user identifiers can be defined with respect to the set U and a defined order relation '<' wherein, for all $u1, u2 \neq u1 \in U$, either $u1<u2$ or $u2<u1$. Viewed in these terms, the nodes 302 are assigned ranges of user IDs:

node 303*a*: [u0, u1]
node 302*b*: [u1+1, u2]
node 302*c*: [u2+1, u3]
etc., where [a,b] denotes the subset a, b and all values in U in between a and b with respect to the order relation '<'. The definition of the order relation is arbitrary provided it is applied consistently within the content processing system 202, though it can be convenient for it to reflect typical mathematical conventions such as the ordering of the natural numbers or the alphabet in the case of alphanumeric characters or hexadecimals etc. An example is illustrated in FIG. 4, showing ranges of events 316*f*, 316*g* allocated to nodes 302*f*, 302*g* respectively.

Note that, whilst it is convenient to allocate ranges of events in this manner, it is not essential. What is important is that all events for the same user ID are allocated the same node 302.

At each of the nodes 302*a*-302*h*, the events allocated to that node are stored on disk at that node (i.e. in local storage 303*a-h* respectively) and are grouped therein according to user ID, i.e. in contiguous groups. That is, they are stored in a data structure having one group for each user ID assigned to that node, with all events associated with that user ID (and only those events) stored in that group.

As explained below, this grouping in the local storage allows an extremely quick and efficient process, in which filtering and counting of the events is performed simultaneously to generate a unique user count for that filter.

Particular advantages are gained where events for a user are held in physically contiguous storage locations, particularly in a system working with billions of events. There may be a need to 'freeze' an index and periodically create a new one when enough new data arrives. Contiguous physical storage locations of the events in the local storage reduce fragmentation on the disk when new indexes are created and allow faster access to the local storage in performing the filtering and counting procedure. However the grouping could be a logical grouping only, not necessarily reflected at the physical level but it is expected that there will be a performance benefit to physical grouping.

By way of example, FIG. 4 shows, for events 316*f* allocated to node 302*f*, groups gpr1, gpr2, gpr3, ..., grpN-1, grpN for user IDs usr4692, usr4693, usr4696, ..., usr7929, usr7929A respectively.

Figure 6:
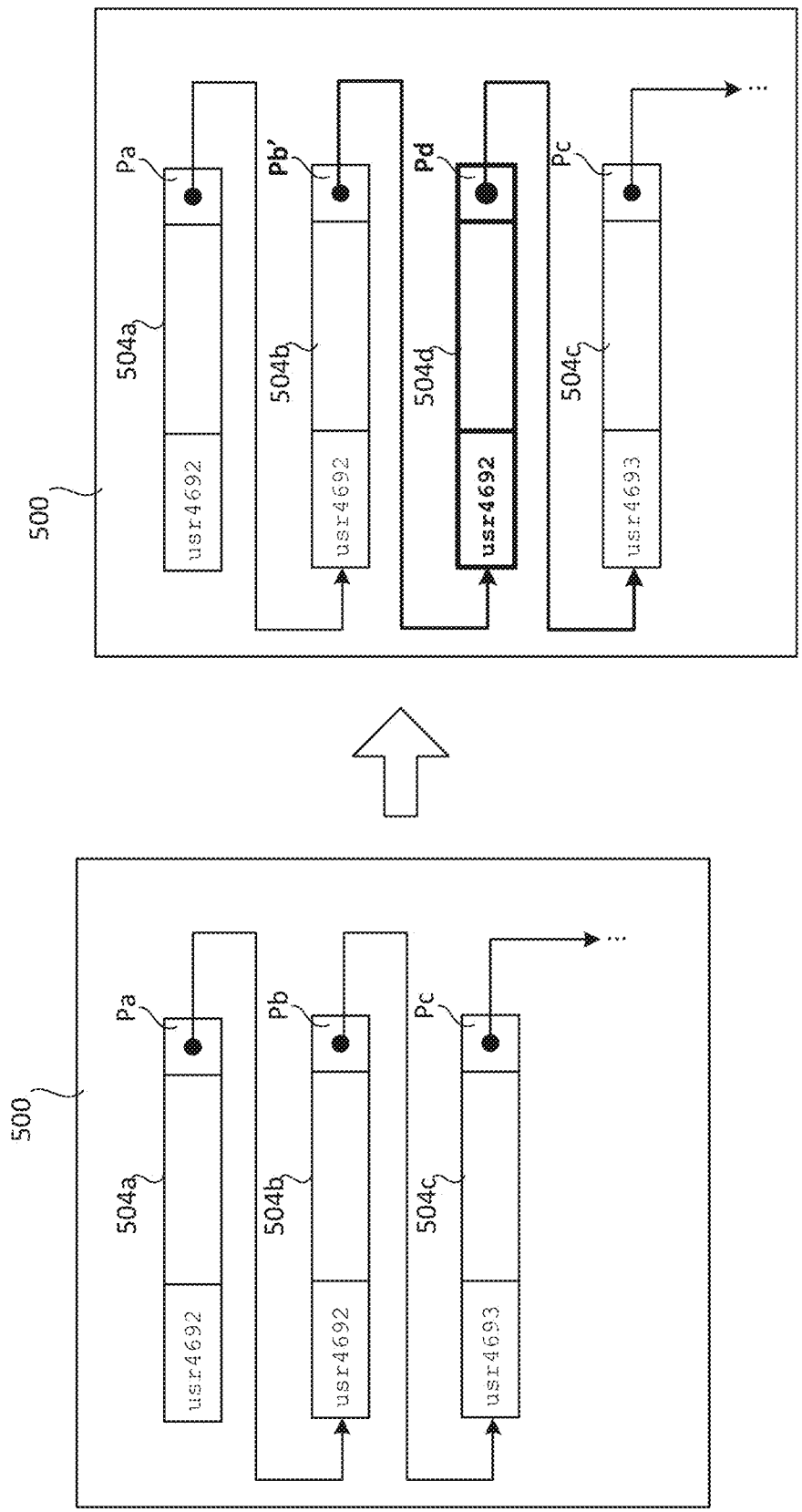
FIG. 6 shows a schematic illustration of an ordered data structure.

A convenient way of implementing this grouping is by simply sorting the user IDs in the local storage with respect to the ordering function '>', as in the example of FIG. 4. That is, the range of events allocated to each of the nodes 302 can stored in an ordered data structure in the local storage, ordered according to the user identifiers in the events, where each group is then just the range of events for that group's user ID in that context. Regarding the ordered data structure, with reference to FIG. 6, a simple list data structure 500 is shown, in which each event is 504a, 504b, 504c is stored, at a respective storage location, in association with a respective pointer Pa, Pb, Pc to the storage location at which another of the events is stored, i.e. the next event in the list, or some other indicator indicating the next event on the list (and all description below applies equally to other such indicators). As will be appreciated, this is a simplified example for the purposes of the invention and more complex ordered data structures can be used depending on the context. When a new event is allocated to that node, it can be stored at any available storage location, and the pointers updated to preserve the ordering. For example, FIG. 6 shows how upon assignment of a new event 504d for user ID "usr4692" to node 302f, the pointer Pb for event 316b (also usr4692) that previously pointed to the first event for "usr4693" (504c), can be replaced with a pointer Pb' to the location at which the new event 316d is stored in the local storage 303f; and it is now the new event 504d that is stored in association with a pointer to event 504c. It is not necessary to change the physical storage locations, but a choice may be made to do so as an optimization to prevent excessive fragmentation on the disk.

Note that sorting the events on disk in this way is also not essential: the fundamental efficiency savings stems from the grouping of events according to user ID (in any order), with one group per unique user ID. Sorting is simply a convenient and efficient way of implementing the grouping.

The addition of a new event can be performed as part of the staged merge mentioned above. Newly allocated events are temporarily held in a queue of the node 302, and then periodically merged with the existing events at that node in batches (optionally with some physical level defragmentation of the events on the disk at each merge). Alternatively, new events can be added in real-time as they are allocated (possibly with some periodic defragmentation).

In this manner, within the content processing system 202 as a whole, events are grouped precisely according to user ID across the nodes 302.

To put it another way, the nodes 302 implement a form of distributed database (distributed within the data centre) in which the events 316 are stored and the database is (horizontally) partitioned across the nodes 302 according to user IDs into global (horizontal) partitions, also called "shards", with one shard per node 302. The shard boundaries are chosen so that they never divide events for the same user, i.e. with all events for the same user in the same shard, such that the shard boundaries always coincide with group boundaries. As explained in more detail below, this allows the shards to be processed in parallel by the nodes 302, to generate a local unique user count for each of the shards (i.e. at each node 302), and the local user counts across all of the shards (i.e. all of the nodes 302) can simply be summed to generate a total user count with no risk of double-counting.

An indicated, incoming streams of time-dependent events are not normally partitioned in this way based on user ID—it is more usual to horizontally partition such events according to time.

In addition to this "global" partitioning across the nodes 302, locally, at each node 302, the shards can be further partitioned into (horizontal) sub-partitions for processing at that node, again such that the sub-partitions do not divide groups of count items for the same user, i.e. with all events for the same user in the same sub-partition of that shard such that the sub-partition boundaries also always coincide with group boundaries. As will be apparent in view of the following, this allows the sub-partitions at each of the servers 302 to be processed in parallel to generate respective local unique user counts for those sub-partitions at that server, which can then simply be summed to generate the local user count for the server, i.e. for the shard as a whole.

For example, the shard may be sub-partitioned with one sub-partition per CPU. That is, within each of the nodes 302, each of the user identifiers assigned to that node 302 (server) can be assigned to exactly one of the CPUs in that server, where events with that ID are processed by that same CPU. That is, each group of events at each server is assigned to one CPU responsible for processing those events.

An alternative is to sub-partition between processing threads. Which one is best depends on the architectural context. The basic idea is to avoid inefficiencies due to CPUs having to context switch between many threads. If the main bottleneck is CPU utilization, having a CPU dedicated to each data partition is a good way of maximizing local CPU caches and overall processing throughput. If the main bottleneck is memory, network or other resources, then it may be efficient to have more partitions than CPU cores, because the overhead of context switching can be compensated by making better use of CPUs in idle times. It is noted that, a CPU core or thread can be a content processor as the term is used herein, with the present techniques being applied across, say, the CPU cores or threads of a server.

Each of the nodes 302 can access the metadata and user attributes in each of the events in its ordered data structure. Either the content itself, or a tokenised version of the content (see later) is held with the metadata. By way of example, FIG. 4 shows metadata 317f, 318f and sets of user attributes 318f, 318g for the user identifiers in the events 316f, 316g respectively.

The filter coordinator 306 can instruct all of the nodes 302 to filter their allocated events according to a desired filter, where a key aim is to obtain a count of the total number of unique users across all of the nodes 302 who satisfy the desired filter. The filter can be defined in a query submitted to the system, and in this context the filter coordinator 306 and total count generator 308 can be considered part of the query handler 210. In the context of the system described above, the filter can be an interaction filter or a query filter, for example the query filter used to generated results for a given bucket. As noted, multiple (possibly thousands) of query filters may be applied to respond to a single query, with counts being generated for each.

A filter can be defined in terms of user attributes or event metadata, such as metadata tags (see above), or a combination of both.

For a filter defined in terms of a set of one or more user attributes A1, events with matching user attributes satisfy that filter. For a filter defined in terms of a set of one or more tags T1, events with matching tags satisfy that filter.

Before discussing the filtering operations, there follows a description of how content can be stored. Content items can be held in their entirety, for example if a particular field (e.g. title) might be needed verbatim as a value in a distribution query (discussed later). Alternatively, indexed tokens only may be held, with the original content discarded, as explained below.

In order to make it efficient to filter a large corpus of documents by certain keywords, a standard indexing technique (called "inverted indexing") can be used, where each document is tokenised into individual terms, and then a lookup table is created for each term in the corpus dictionary, each pointing to a list of document IDs where such term appears. For example take a simplified example of two documents:

Doc001: the brown fox jumps over the lazy dog
Doc002: the dog jumps over the sofa
Inverted Index:

| term | location (Doc#:position_in_the_doc) |
|---|---|
| the | Doc001:1, Doc001:6, Doc002:1, Doc2:5 |
| brown | Doc001:2 |
| fox | Doc001:3 |
| jumps | Doc001:4, Doc002:3 |
| over | Doc001:5, Doc002:4 |
| lazy | Doc001:7 |
| dog | Doc001:8, Doc002:2 |
| sofa | Doc002:6 |

This way, if there is a requirement to know which documents mentioned the word "dog", all that is needed is a single lookup against the inverted index, instead of having to scan every single document in the corpus each time. If returning the original document verbatim is not a requirement of the system, storing the "tokenised" inverted index only is enough for filtering and returning the correct document IDs. In this case, given the original document is discarded after indexing, it is necessary to keep a copy if a re-index operation is needed.

A key flexibility of the content processing system 202 is that filtering can performed on any desired combination of attributes A1 and tags T1. That is, a filter F(T1,A1) that is able to isolate content items based on the content itself (based on the one or more tags T1), the users who have published or consumed that content (based on the one or more attributes), or a combination of both. For example, for a simple filter F=[T1 AND A1], any of the events which:
  matches (all of) those tag(s) T1 and
  is associated with (all of) those attribute(s) A1
matches that filter (and no other events). However it is also possible to define more complex filters, using combinations of logical operators, such as AND, OR and NOT.

Such filters constitute powerful building blocks for complex queries, that allow rich information about the specific type of content (defined in terms of tags T1) being shared between users in specific demographics (defined in terms of attributes A1) to be extracted from the filtered events.

Regarding terminology, the term "filtered events" (or similar) refers to the subset of events that do satisfy the filter. That is, the remaining events after all of the other events have been filtered out. A user is said to satisfy a filter when there is at least one event for that user currently assigned to one of the nodes 302 which satisfies that filter.

The aim is to determine:
1) the total number of unique events, across all of the nodes 302, that satisfy that filter.
2) the total number of unique users, across all of the nodes 302, that satisfy that filter F(TA,A1); and As noted above, these two pieces of information are powerful building blocks when it comes to analysing the available data.

This information is embodied in a total user count and a total interaction count respectively, generated by the total count generator 308 in the manner that will is described below.

With regards to 2), a key advantage of uniquely assigning each user identifier to only one node only, and allocating all events to that node for filtering and aggregation, is that, when instructed to apply any given filter, each node can simply count the number of unique users who satisfy that filter for the subset of events allocated to it, to generate a local user count. Because there is no overlap in the users or events between different nodes, the local user counts across all of the nodes 302 can simply be summed together to generate the total user counts respectively, with no risk of users being double-counted. Moreover, by grouping the events according to user at each node, this count can be derived in an efficient boundary counting procedure that filters and counts events simultaneously.

Figure 5:
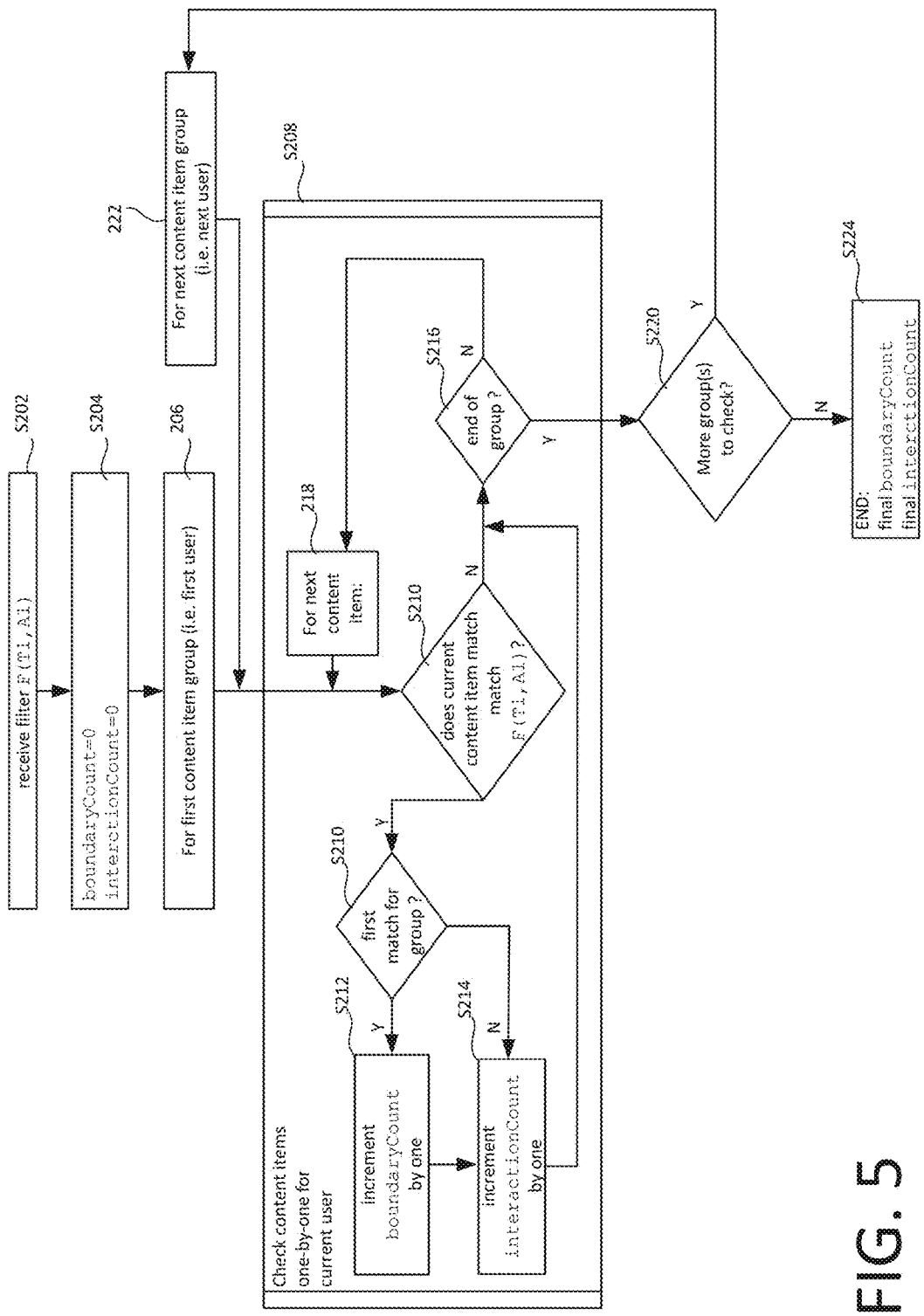
FIG. 5 shows a flowchart for a method of filtering and counting events in an index and FIG. 5A shows an example of the method applied to certain events.
Figure 5A:
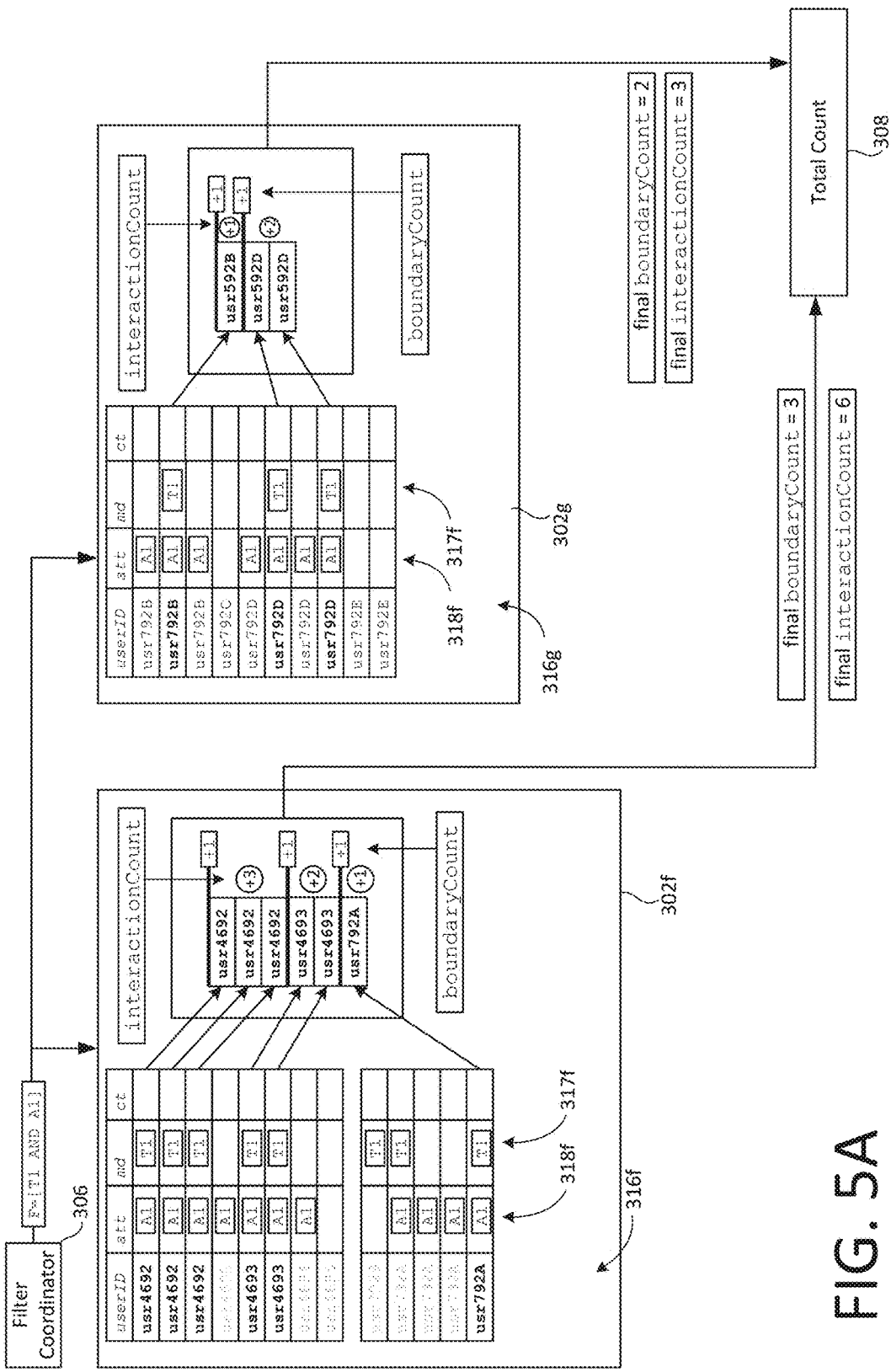

With reference to FIGS. 5 and 5A, a process of generating a local user count for a target partition will now be described, in which events are simultaneously filtered and selectively counted (i.e. only counted if they satisfy the filter). FIG. 5 shows a flow chart for the process and FIG. 5A is a graphic illustrating certain principles of the process by way of example.

The process can be applied, in parallel, to each shard as a whole, at the node 302 to which that shard is allocated to generate a local user count for that shard. However, where the processing servers 302 have multiple processing units, it is preferably applied to each sub-partition of that shard in parallel, to generate respective local user counts for those sub-partitions, which can then be summed to generate the local user count for that shard. Accordingly, the target partition to which the process is applied can be a shard, or a sub-partition of a shard.

The process begins at step S202, by the filter coordinator 306 instructing all of the nodes 302 to apply a filter F(T1, A1).

A boundary count variable (boundaryCount) is used to count total unique users who satisfy the filter, by counting boundaries between any groups of events that satisfy the filter, which is possible because they are grouped according to user ID. An interaction count variable (interactionCount) counts the total number of interactions that satisfy the filter, by simply counting all events that satisfy the filter.

FIG. 5A illustrates the boundary counting principle applied to the events 316f and 316g of nodes 302f and 302g respectively for a filter F=[T1 AND A1]. Events that satisfy the filter [T1 AND A1]—that is, whose user has (all of) the attribute(s) A1 and which matches (all of) the tag(s) T1—are shown bold on the right-hand-side, and separated-out on the left-hand side from the remaining events that do not; the latter are also greyed out on the left-hand side, and include events whose users have attributes A1 but do not match tags T1 and vice versa. As shown, there may be multiple events for a particular user that satisfy the filter; however, whilst this is certainly germane to the interaction count, it should not affect the unique user count. Rather, for the latter, what matters is the number of boundaries (shown as thick black lines) between the remaining groups of events. These boundaries can be counted very efficiently when the events are grouped (e.g. sorted) according to user ID, and the final boundary counts across multiple partitions can simply be summed with no risk of double-counting.

Returning to FIG. 5, boundaryCount and interactionCount are initialized to zero (S204) and, for a first of the event groups (206)—that is, a first of the user IDs assigned to the target partition—the events in that group are processed in turn to determine whether any of those events match the filter F (S208). That is, starting with a first of the events in that group, the process checks each event one-by-one to determine whether it matches the filter F, in a boundary counting procedure S208 that is performed for the current group until all events in that group have been checked.

The boundary counting procedure S208 proceed for the current group as follows, commencing with the first event in the current group.

At step S210, the current event in the current group is processed to determine whether it matches the filter F. If not, the method proceeds to step S216, where if the end of the group has not yet been reached, i.e. there are still event(s) in the current group to be checked, the boundary counting procedure S208 continues for the next event in the current group (218), commencing with step S210 for that event.

However, if the current event does match the filter F at step S210, the method branches depending on whether this is the first time an event matching the filter F has been found in the current group (S210):
- if so, boundaryCount is incremented by one (S212) and interactionCount is incremented by one (S214). Although shown in that order, steps S212-214 can be performed in reverse order or in parallel. Both counters are incremented because the matching event not only represents another interaction matching the filter F but one also performed by a user who has not been counted yet;
- if not, then the method branches straight to step S210 to increment interactionCount without incrementing boundaryCount. This is because, although that event constitutes a unique interaction, it is one performed by a user who has already been counted.

From step S214, with one or both counters incremented, the process proceeds to step S216, and from there as described above.

When the end of the current group is reached (S216, "Y" branch), the method proceeds to step S220, where if there is still at least one more group to be checked (that is, one or more users in the partition who have not been checked), the boundary counting procedure S208 is repeated as described above for the next group (222) in the partition, i.e. the next user, commencing at step S210 for the first event in the next group—noting that, now that the process has moved on to the next user, it is necessary to increment boundaryCount once more (S212) should another event satisfying the filter F be located.

Once every group in the partition has been checked in full, the method terminates at step S224 (S220, "N" branch). As will be apparent, the values of boundaryCount and interactionCount at this point now reflect, respectively, the total number of unique users and total number of events that satisfy the filter F, for the partition that has just been processed.

For sub-partitions of a shard (where applicable), the final counts as generated across all sub-partitions of that shard can simply be summed to give local user and interaction accounts for that shard, with no risk of users being double-counted in the user count. Across all shards, the local user counts for those shards can, likewise, simply be summed to give total user and interaction counts across the system 202 as a whole, again with no risk of users being double-counted.

It is noted that the process of FIG. 5 is exemplary, and optimizations and extensions are envisaged that remain within the scope of the present invention. For example, in some contexts, it may be possible to skip through events for certain users, where it has already been determined that those users do not have the desired attributes to optimize the process.

What is more, the process can be readily extended to more than two variables. That is, additional counters may be used to increase the level of information extracted.

For example, in the case of a query filter F and requesting that the results of that filtering be broken down into multiple buckets B1, . . . , BM (that is, with F defining a subset in the index, with additional filtering of the subset to provide the breakdown), respective counters can be maintained for each bucket, to provide a count for every bucket in a single iteration of the process. In that case, separate interaction and boundary counters can be updated for each bucket, in addition to overall counts for the subset defined by F is desired.

Privacy Policy:

As indicated above, to implement a robust privacy policy, various privacy controls are placed on the output of information from the content processing system to ensure that the users' privacy is preserved at all times. The goal is to prevent the identification of individual users in the results and also prevent the disclosure of user characteristics that can be attributed to an individual user (for example, to prevent the results from being used to infer the age, gender or other user attribute of a particular social media user).

These privacy controls will now be described in greater detail, along with explanations of various attack vectors that these constrains render ineffective. As will become apparent in view of the following, not only are these constrains highly effective, protecting against a number of attack vectors, they are also fast to apply and easy for users to understand. They can also be updated dynamically, i.e. "on-the-fly", without downtime.

Some important aspects of the privacy policy can be summarized as follows:
- Quantization of results and minimum audience size: to prevent disclosing tiny audiences within larger audiences by doing set algebra across query results;
- Redaction controls: minimum number of unique authors for overall audience and each data bucket;
- Jitter/noise: prevent other attacks by slightly "fuzzing" the results before quantization where necessary, or otherwise ensuring that the counts are generated with sufficient error before quantization (see below).

In addition, each of user events is purged from the index upon expiry of a retention period for that user event (e.g. ~30 days from a timing of that event), whereby user events are not counted once purged. Moreover, user events for users who are under 18 threshold are never counted.

Figure 7:
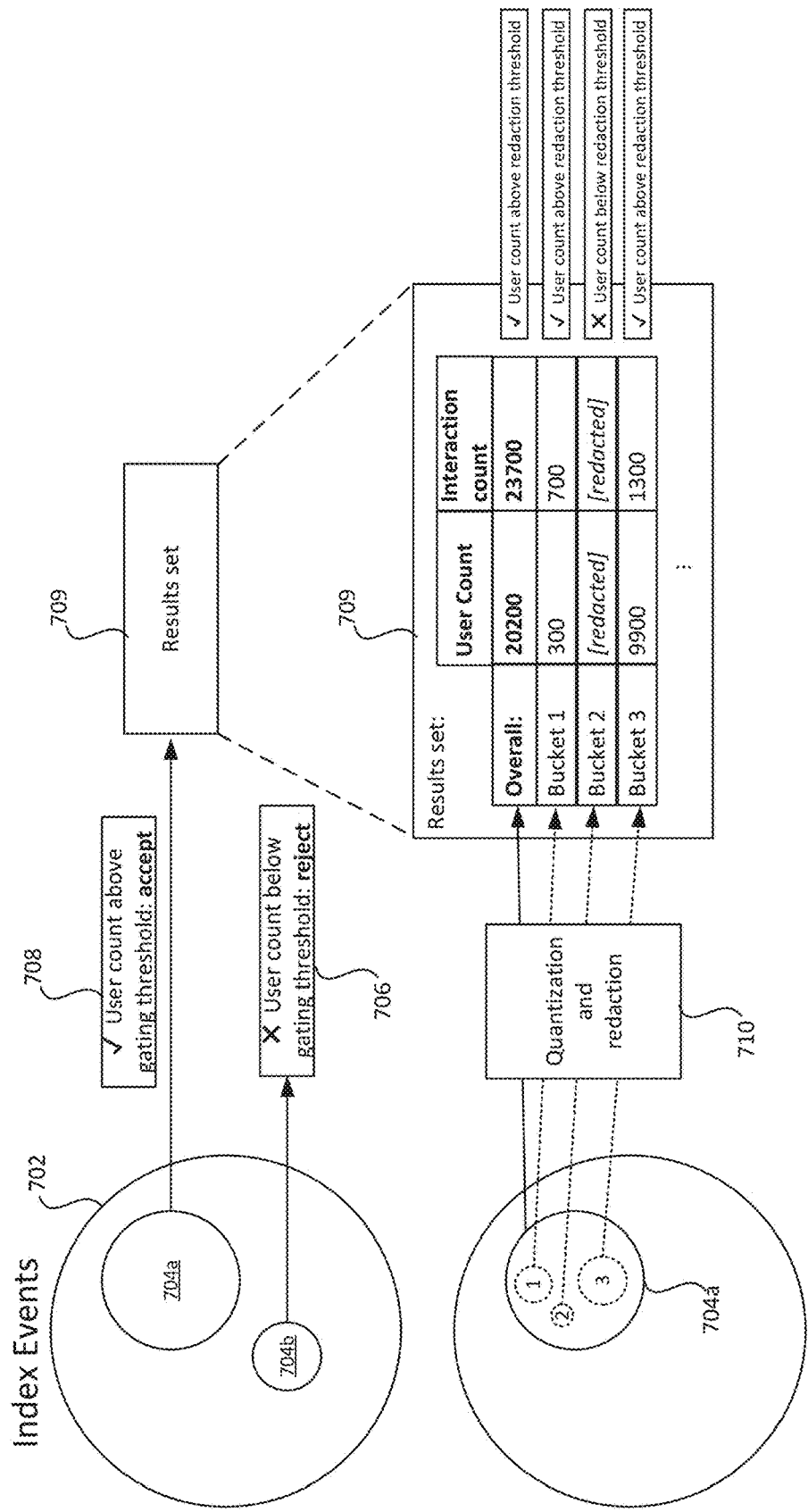
FIG. 7 shows a high level illustration of certain privacy controls.

FIG. 7 shows a schematic high-level overview illustrating certain underlying principles relating to audience-size gating, quantization and redaction.

Block 702 represents all events in an index on which a query is to be run. That is, all events that satisfy an interaction filter (~606, FIG. 1A) used to build that index. As noted, a user can run a query on a subset of the events 702 in the index. For example, the user may wish to restrict the parameters of the query to certain topics, or to certain user demographics (age, gender, job function etc.). By way of example, first and second subsets 704a, 704b for first and second queries are shown defined by first and second query filters respectively (~626a, FIG. 1B).

Audience-size Gating:

In accordance with the privacy policy, queries are only permitted on subsets of events having at least a minimum number of unique users. That is, where the overall unique user count for events satisfying the query filter is at least as great as a minimum audience-size gating threshold S. This can be fixed threshold, such as S=1000 users; in which case, any query filter for which the overall unique user count is less than this will be rejected outright, with no information returned at all for that query filter. In FIG. 7, the unique user count across the second subset of events 704b is below the minimum audience-size gating threshold, therefore the second query is rejected outright (block 706) with no information about that second subset 704b being released. However, the unique user count across the first subset of events 704a exceeds the minimum audience-size gating threshold, therefore the first query is accepted (block 708). Consequently, a set of results 709 is generated in response to the second query for releasing to the user.

Figure 7A:
FIG. 7A shows an example of minimum audience-size gating.

By way of example, FIG. 7A shows how a query filter for "Pepsi lovers in Alameda" is rejected because the overall number of unique users within the index who satisfy that query filter (~second subset 704b) is below the minimum audience-size gating threshold S. However, a query filter for "Pepsi lovers in San Francisco, Oakland or Alameda" is accepted because a greater number of users in the index satisfy that filter (~first subset 704a), to the extent that the overall unique user count for that query exceeds the minimum audience-size gating threshold S.

Quantization:

For accepted queries, the results are also quantized and selectively redacted before any aggregated information is released responsive to a query. Quantizing implies that when counts are organized in buckets (~656.1-4, FIG. 1B), they are 'rounded' before appearing in released information. Moreover, if a bucket has a user count below a certain number, this bucket is redacted entirely such that neither the user count nor the interaction count for that bucket is released. In some cases, the existence of a redacted bucket may not be revealed at all. In such cases, the bucket name is also redacted as well as the counts: merely knowing that a certain buckets exists (albeit in volumes lower than the redaction threshold) could represent by itself a leak of information, in certain cases, especially when the full list of possible values for a certain field is not known a-priori.

Returning to FIG. 7, for queries that are accepted, quantization and redaction is applied to the resulting user counts and interaction counts (block 710, FIG. 7). In this example, in response to the second query, a breakdown of the results for the first subset of events 704a is provided, for example by age, gender, job function, topic or combinations thereof etc. That is, individual counts are provided for narrower subsets of the events 704a (buckets), each defined by a bucket filter (~626b, FIG. 1B) applied on top of the query filter. By way of example, FIG. 7 shows three buckets within the subset of events 704a.

The user and interaction counts for each bucket can for example be quantized by rounding each of them down to the nearest multiple of a chosen integer $\Delta Q$. That is, such that any count released to a customer is always a matching one of a set of quantized values:

$$\{Q_n\}=\{Q_0=0,\ Q_1=\Delta Q,\ Q_2=2*\Delta Q,\ Q_3=3*\Delta Q,\ Q_4=4*\Delta Q,\ \ldots\}$$

where those values $Q_n$ are referred to herein as "quantization boundaries". In this context $\Delta Q$ constitutes a fixed "quantization range" of the quantization, i.e. the difference between adjacent pairs of quantization boundaries, which is fixed in that it is the same for all adjacent pairs of quantization boundaries. That is, $Q_{n+1}-Q_n=\Delta Q$ for all n:

$Q_1-Q_0=\Delta Q$
$Q_2-Q_1=\Delta Q$
$Q_3-Q_2=\Delta Q$
$Q_4-Q_3=\Delta Q$
etc.

The set of results in FIG. 7 is also shown to include an overall unique user count and overall interaction count for the subset of events 704a as a whole. These are also quantized in the same way.

The un-quantized (original) counts are never released by the system—only the quantized counts are ever released to customers, and those are only released when they are not less than a redaction threshold.

Redaction:

Where the unique user count for any given bucket is less than a redaction threshold R, the results for that bucket are "redacted" i.e. neither a unique user count nor an interaction count is released for that bucket. That is, apart from the fact that it may be possible, in certain circumstances, to infer from the results that there are fewer than R unique users for that bucket, all information for that bucket is withheld. For convenience, $R=\Delta Q$ may be chosen, so that any bucket with a quantized user count of zero is redacted. However, this is not essential, for example a higher redaction threshold could be set.

The fact that the result has been redacted for a particular bucket may be explicitly indicated in the results set 709 (as in FIG. 7 for bucket 2), or both the user count and the interaction count may simply be given as zero. Alternatively, that bucket may simply be omitted from the results set 709 all together, such that it is not evident from the results set 709 that this bucket has even been considered. For example, where a customer requests a breakdown by topic, buckets for topics that do not reach the reaction threshold may simply never be revealed to the customer.

Figure 7B:
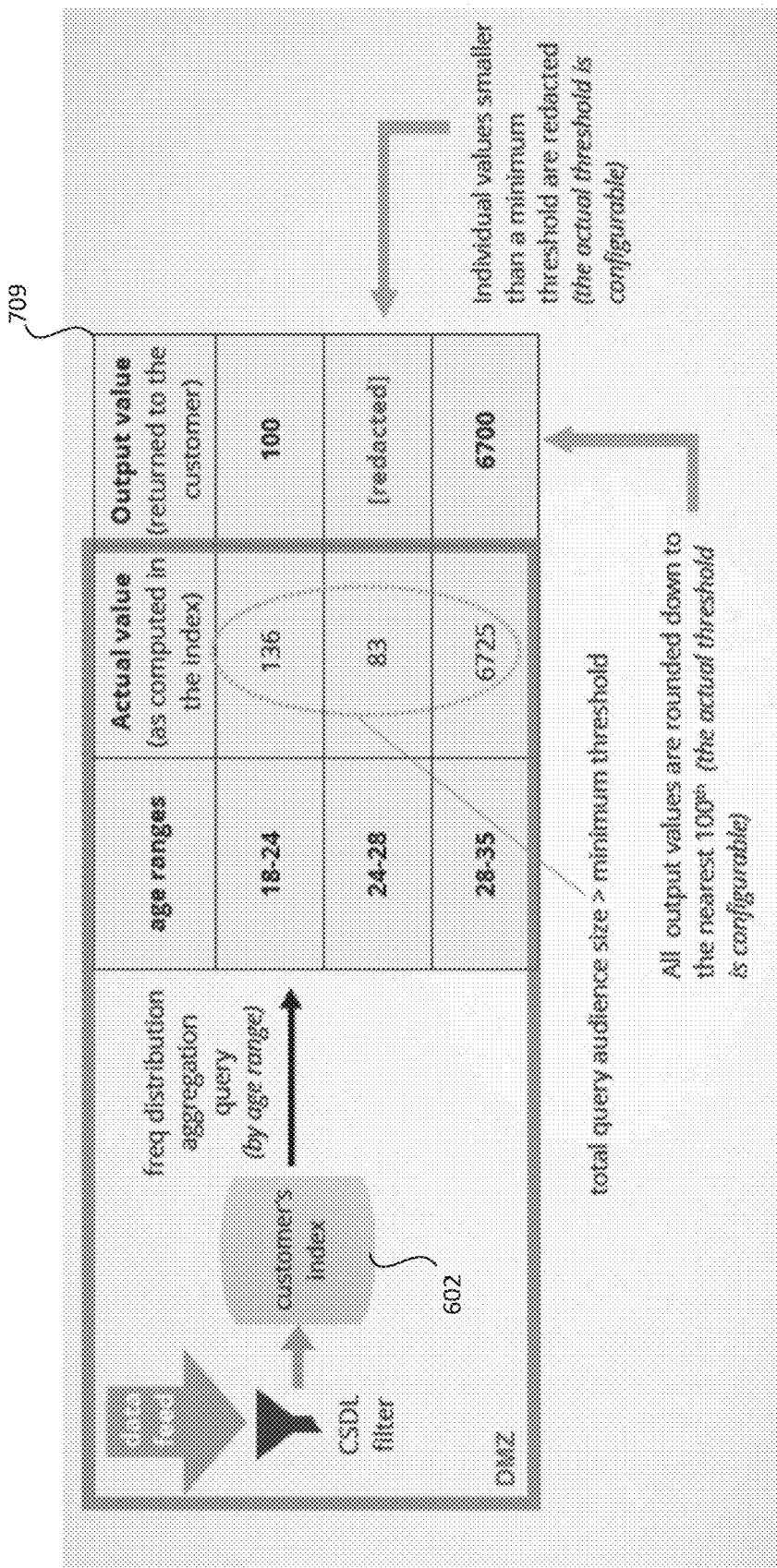
FIG. 7B shows an example of quantization and redaction.

FIG. 7B shows a specific example, where the set of results 709 is broken down according to age brackets. That is, where the buckets correspond to user age brackets. For each age brackets, (non-quantized) user and interaction counts are generated within the system, but never released (note only one count is shown for each bucket in FIG. 7B). First these are quantized or—for any age bracket whose unique user count is below the redaction threshold R—redacted, such that neither the unique user count nor the interaction count for that age bracket are released.

Attack Scenario Walkthroughs

Homogenous Group Attack

Minimum audience sizing gating (threshold S) ensures only audiences over a certain size can be analysed. This makes it more difficult for a malicious user to execute a "homogeneous group search attack", in which a sensitive attribute of an individual is inferred through their membership of a group of people all sharing the same attribute. This is because it is very difficult to arrange for homogeneity in larger audiences, especially when analyzing their organic activity rather than the static audience.

Set Balancing Attack

In the face of the constraint that only buckets with more than 100 authors are made visible, set balancing attacks attempt to retrieve a demographic attribute of an individual by comparing results from multiple larger audiences.

Suppose an attacker knows that a specific man tweeted on a unique hashtag on a specific day and wants to discover his age. He attempts this by running two queries:

Query A: age breakdown of all women.
Query B: age breakdown of the audience consisting of all women plus men tweeting on the unique hashtag;

The age breakdown of all women servers as "padding": since the audience of all women is large, he expects to get results for both queries, so he compares the counts given in A and B for each age bracket, expecting one of the buckets to have a higher count, likely corresponding to the small group of users the individual man belongs to. The padding set is usually selected so that it is mutually exclusive with the small set under observation (i.e. the two sets have no overlap, so the set difference operation is straightforward)—all women vs. specific man in this example. For example, without quantization, the results he gets back might look as follows:

|  | Query A | | Query B | |
|---|---|---|---|---|
|  | user count | interaction count | user count | interaction count |
| 18-24 | 1104752 | 1214998 | 1104752 | 1214998 |
| 25-34 | 927150 | 1029488 | 927150 | 1029488 |
| 35-44 | 669702 | 693816 | 669702 | 693816 |
| 45-54 | 358434 | 419349 | 358435 | 419350 |
| 55-64 | 203391 | 221958 | 203391 | 221958 |
| 65+ | 112265 | 124850 | 112265 | 124850 |

As is evident, the man in question shows up as an extra user in the 45-54 age bracket, and his tweet shows up as an extra interaction for that bracket. Consequently, the attacker can infer that the man's age is 45-54.

However, with quantization of results, in 99% of cases queries A and B will return the same quantized counts in this scenario. For example, with the above example, each count is rounded down to the nearest hundred before release, completely obscuring the man within the results:

|  | Query A | | Query B | |
|---|---|---|---|---|
|  | quantized user count | quantized interaction count | quantized user count | quantized interaction count |
| 18-24 | 1104700 | 1214900 | 1104700 | 1214900 |
| 25-34 | 927100 | 1029400 | 927100 | 1029400 |
| 35-44 | 669700 | 693800 | 669700 | 693800 |
| 45-54 | 358400 | 419300 | 358400 | 419300 |
| 55-64 | 20300 | 221900 | 20300 | 221900 |
| 65+ | 112200 | 124800 | 112200 | 124800 |

However, where the size of the padding is 99 mod 100, a situation can still arise when addition of the individual can be detected, for example, assuming the un-quantized results were in fact:

|  | Query A | | Query B | |
|---|---|---|---|---|
|  | user count | interaction count | user count | interaction count |
| 18-24 | 1104752 | 1214998 | 1104752 | 1214998 |
| 25-34 | 927150 | 1029488 | 927150 | 1029488 |
| 35-44 | 669702 | 693816 | 669702 | 693816 |
| 45-54 | 358499 | 419349 | 358500 | 419350 |
| 55-64 | 203391 | 221958 | 203391 | 221958 |
| 65+ | 112265 | 124850 | 112265 | 124850 |

In this case, the quantized results returned would be:

|  | Query A | | Query B | |
|---|---|---|---|---|
|  | quantized user count | quantized interaction count | quantized user count | quantized interaction count |
| 18-24 | 1104700 | 1214900 | 1104700 | 1214900 |
| 25-34 | 927100 | 1029400 | 927100 | 1029400 |
| 35-44 | 669700 | 693800 | 669700 | 693800 |
| 45-54 | 358400 | 419300 | 358500 | 419300 |
| 55-64 | 20300 | 221900 | 20300 | 221900 |
| 65+ | 112200 | 124800 | 112200 | 124800 |

In this specific instance, it would still be possible to infer the age of the man in question as 45-54 from the higher quantized user count for query B, even though the un-quantized results are never released.

As another example, assume that the man in question had tweeted on the unique hash tag three times on one day. In this case, the underlying counts might for example be:

|  | Query A | | Query B | |
|---|---|---|---|---|
|  | user count | interaction count | user count | interaction count |
| 18-24 | 1104752 | 1214998 | 1104752 | 1214998 |
| 25-34 | 927150 | 1029488 | 927150 | 1029488 |
| 35-44 | 669702 | 693816 | 669702 | 693816 |
| 45-54 | 358434 | 419397 | 358435 | 419400 |
| 55-64 | 203391 | 221958 | 203391 | 221958 |
| 65+ | 112265 | 124850 | 112265 | 124850 |

This gives quantized counts of:

|  | Query A | | Query B | |
|---|---|---|---|---|
|  | quantized user count | quantized interaction count | quantized user count | quantized interaction count |
| 18-24 | 1104700 | 1214900 | 1104700 | 1214998 |
| 25-34 | 927100 | 1029400 | 927100 | 1029488 |
| 35-44 | 669700 | 693800 | 669700 | 693816 |
| 45-54 | 358400 | 419300 | 358400 | 419400 |
| 55-64 | 203300 | 221900 | 203300 | 221900 |
| 65+ | 112200 | 124800 | 112200 | 124800 |

Again, it becomes possible in this case to infer the man's age bracket, this time from the higher quantized interaction count on query B.

In order to take advantage of this, a malicious user would have to be able to precisely control the size of the "spectator" audience (i.e. the padding), and the nature of the content processing system makes this very difficult. In the context of the described system, the "group of all women" is actually all women who are actively publishing/consuming content in the given time period, i.e. it's not just based on the demographic properties of the member base, but it's based on their activity. Such activity is difficult to control making a set balancing attack on the quantization boundaries very difficult to engineer. Nevertheless, despite the inherent difficulty in exploiting this, it is still a potential point of vulnerability that can't be ignored.

However, it is also noted that, it the walkthrough of the attack above, it is implicitly assumed that the counts are error free.

When HLL or other probabilistic counting method are used, this is not the case: for example, the audience size counts, before being quantized, inherently include some random noise, and are therefore only approximate counts with an intrinsic error. The noise is intrinsic to the implementation of the unique author counting algorithm, which relies on probabilistic data structures, rather than individually counting user events. The same would apply to a probabilistic estimation of the interaction counts.

As context, it is useful to consider some of the principles underlying HLL and its variants. At its core, HLL exploits the following observation: when a set of values is hashed—that is, a hash function is applied to each value to generate a fixed length bit sequence (hash value) where the probability of each bit being a 1 or 0 is more or less 50/50 and independent of the other bits—then, for a large enough data set, the resulting hash values will look like:

| form of hash value | expected percentage of this form | |
|---|---|---|
| 1xxxxxxxxx | ~50% | probability of the first bit being a 1 is ~½ |
| 01xxxxxxxx ... | ~25% | probability (½)^2 |
| 001xxxxxxx ... | ~12.5% | probability (½)^3 |
| 0001xxxxxx ... | ~6.25% | probability (½)^4 |
| 00001xxxxx ... | ~3.125% | probability (½)^5 |
| ... | ... | ... |
| 0000000001 ... | ~0.1% | probability (½)^10 |

Now, looking at this the other way round and in very high-level terms, when, say, there is a single hash value of the form 0000000001xx observed in a set of hash values computed in thus way, chances are there ~1000 unique values in the original set [0.1% of 1000=1 such hash value expected]. Applied to events, each event can be hashed, and, in essence, all the system needs to keep track of is the longest run of 0's observed so far in the hashed values to estimate the number of unique events observed, without having to count those events individually. HLL builds on this a very coarse approximation, in order to reduce the margin of error—but the basic premise is the same.

The inventors of the present invention have recognized that, with such probabilistic estimation techniques, the intrinsic errors in the result counts can be tuned to counter set-balancing attacks on the quantization boundaries. That is, the intrinsic error can be tuned so that it is sufficiently large that it is not possible for an attacker to attribute variations between the quantized counts for a given bucket in queries A and B to the activity of an individual user as opposed to the intrinsic error. HLL and its variants have an error rate that depends on the cardinality of possible IDs in the set and the amount of memory that is allocated to each HLL object (and the error rate can be tuned by tuning the memory allocation).

It is noted that HLL and its variants are just some examples. Other probabilistic procedures can also be used to generate an approximate count. Generally, with probabilistic counting, it may be sufficient to rely on the intrinsic error to provide the necessary protection provided it is of sufficient magnitude, i.e. at least 2-3%. This may need some tuning to ensure a sufficient error.

However, the inventors of the present invention have also recognized that moving to an exact counting procedure of the kind described above, in which user events satisfying a filter are individually identified and counted instead, the intrinsic error is lost. Without something to replace it, the system would become more vulnerable to this form of set-balancing attack. This applies both to the exact user counting procedure and the exact interaction counting procedure.

To prevent this, where an exacting counting procedure is used, somewhat counterintuitively, a small randomized "jitter" (artificial, random error) is applied within the content processing system 202 to introduce some deliberate error into the otherwise-exact user and interaction counts before they are quantized. That is, artificial, error data is randomly generated and used to introduce a deliberate error into the otherwise-exact counting procedure (i.e. which is exact but for that error). The result is an inexact (approximate) count deviating, by a random amount, from the exact count that would be obtained were it not for this error data. The approximate count is close enough to the actual value to be useful, but not exact so as to protect privacy of individuals (of course, from time to time an approximate count might happen to equal the exact count, where a randomly applied deviation happens to be zero—what matters is that this is not guaranteed, such that a range of different randomized deviations is exhibited across multiple counts to guarantee uncertainty).

For example, a plus/minus offset, may be randomly generated for each of the counts (overall user and interaction counts) and applied that count.

It may be convenient to compute the exact count first, and then apply the error to this exact count. This way, an error value can be randomly selected from a percentage range of the total count, for example an error of around ±2% of the exact count is expected to be sufficient, though this is context dependent and may vary depending on audience size. In general, the error in the count is small compared with the count itself to ensure that the count is still a useful measure, but large enough to mask individual users and their activity near the quantization boundaries. Striking a suitable balance will be context dependence, and can be achieved by way of routine design procedure in view of the teaching presented herein.

This error can be introduced at any stage in the counting process. For example, in the architecture of FIG. 4, the jitter can be applied directly to the count across all nodes, by the total count generator 308, but it could also be applied to the local counts at the nodes 302. In any event, the upshot is that the content processing system 202 generates inexact user and interaction counts for each bucket, which correspond to the exact user and interaction count across the events adjusted intentionally by a randomly selected amount.

Such error data is generated individually for each count, to ensure that they exhibit a range of different errors across the set of generated counts.

As noted the term "random" herein is used to mean unpredictable in the sense set out above. In the specific case of HLL, it is noted that intrinsic HLL jitter is deterministic in that it always gives the same result when applied to the same set of user ids into it, regardless of the order in which or frequencies (>0 of course) with which each user appears. This is one benefit of HLL: if the same query is run twice, the same results are returned twice for as long as the number of unique users remains unchanged. However, the jitter is still unpredictable across different queries, hence HLL jitter is still considered random/unpredictable as those terms are used herein.

In general, applying the same jitter for duplicate queries may be preferred in some contexts, as it can provide more consistent and therefore intuitive results—what matters is that the jitter is unpredictable across different queries, as this is what provides the desired protection.

Metering Strategic Populations

In the context of social media, "metering" herein refers to an attempt to obtain or extrapolate information about activity across the platform as a whole, by running very broad queries. An extreme case would be attempting to obtain information about the activity of all users of the platform, for example an interaction count for all of the social interactions on the platform of a particular type (e.g. likes, shares, posts, tweets, re-tweets etc.) or a user count for all active users (in any demographic) in a given month.

There are various approaches for preventing this type of metering.

The operating model can be restricted to a "private recording" (i.e. bespoke index—see above) model, where daily volumes are capped. That is, where each customer is only permitted to record up to a certain number of events in any of his indexes on any given day. For large social media platforms, this may be sufficient, for example where the cap may in practice correspond to, say, less than 1% of the overall daily activity on the platform. However for smaller platforms where the daily caps represent a much higher proportion of daily activity, additional steps may be needed to prevent metering. Moreover, restricting to a private operating model may be undesirable in some circumstances.

Metering may also be prohibited contractually and it can be monitored for through analysis queries submitted. All usage can be tracked to a company or other customer, via the account used to submit the queries. However, this is not necessarily straightforward, and the monitoring requires dedicated resources and is potentially error prone.

Therefore, in the case of a shared index, in which (say) all of the events are held and queries can be run by any customer on the shared index, or smaller platforms where the daily caps on private bespoke indexes may not be sufficient alone, additional technical constraints may be imposed to prevent metering in order to reject queries that are too broad automatically.

Figure 8:
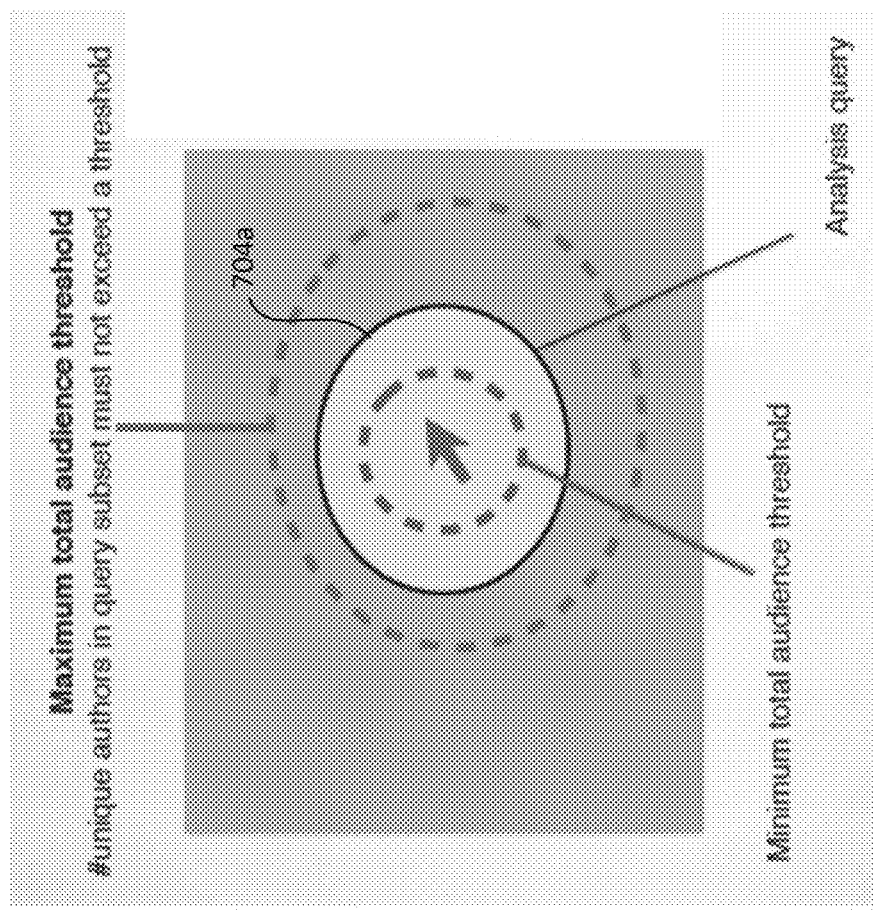
FIG. 8 illustrates an example of a metering prevention technique.

A simple and effective way of achieving this is to return only if total audience size is smaller than a maximum permitted number of users (set by a metering threshold). In this case, as illustrated in FIG. 8 the overall audience size must not be less than the minimum audience-size gating threshold, but must also not exceed the maximum number of permitted users.

The question of where the maximum threshold should be set is context dependent. As a very general rule of thumb, it is expected that an upper limit of ~5% of the total number of active users on the platform as a whole within a relevant time period (global unique user count) would be sufficient, but this may vary depending on the circumstances. A statistical analysis of network traffic for the social media platform may be performed to determine a suitable upper limit. For example a statistical analysis of the events received from the platform. Here, the aim is to set a threshold such that the maximum sample size is too small to draw any statistically significant inferences about activity across the platform as a whole.

Note that computing a unique user count for such queries is intensive, as for broad queries that count can be very large: in order to determine whether or not the query breaches the maximum audience size-gate (which could be millions of users for large platforms), at least that many events need to be counted before the system can decide to reject the query. In the case that the query is ultimately rejected, a significant amount of computing resources are "wasted" in order to reach that decision.

Therefore, as an optimization, it may be preferable, in determining whether to accept or reject a query, to initially estimate the unique user count from a representative sample of the events in the index. That is, by filtering and counting only a representative subset of events in the index. This estimated count may have a relatively large margin of error but which still represents a small a percentage of the maximum audience size. This allows the decision of whether to reject the query on the ground of metering to be made more efficiently.

If the maximum cap is not exceeded, then a more accurate count can be determined from the index as a whole in the manner described above. This can then be used to check whether the minimum audience-size gating constraint is also met (the estimated count would generally not be suitable for this, because the error will be a much larger percentage error of the much lower gating threshold), and if so the query can be accepted and responded to as set out above.

Variable Quantization/Redaction Parameters

The minimum audience-size gate S, quantization range $\Delta Q$ and redaction threshold R are individually configurable system parameters of the content processing system 202.

In the above examples, for convenience, S, $\Delta Q$ and R are fixed at 1000, 100 and 100 respectively. Whilst this is a viable approach, and preferred in some contexts for its simplicity and transparency, there are circumstances in which it may be desirable to vary these parameters.

For example, it may be desirable for the quantization range $\Delta Q$ to vary with the quantized values, where the notation $\Delta Q(*)$ is used to represent the variable quantization range. That is, where each count is quantized to one of a set of quantized values $\{Q_n\}=\{Q_0, Q_1, Q_2, Q_3, Q_4, \ldots\}$ where:

$\Delta Q(m) \neq \Delta Q(m-1)$ for at least one m, with $\Delta Q(n) := Q_{n+1} - Q_n$ being the difference between the n'th and [n+1]'th quantization boundaries.

For example, it may be that $\Delta Q(n)$ increases linearly with n (at least approximately), so that the quantization error remains an approximately fixed percentage of the count being quantized for different sizes of count.

The audience-size gate R for a given query may also be set in dependence on the query itself. That is, with different minimum audience-size gates for different queries, depending on the parameter(s) of those queries. For example, it may be desirable to set a higher minimum audience-size gating threshold for certain audiences, which can be achieved by setting the gating threshold in dependence on a user attribute(s) defined in or derived from the query. This also applies to the individual buckets redaction thresholds and to the bucket sizes (quantization ranges), which can also be set in dependence on the query itself, for example as a function of the user attribute(s) and/or other query parameter(s).

In embodiments, the exact counting procedure can be implemented as follows.

A content processing system for processing content items (interaction events) of a content publication platform having a plurality of users may be provided, the content processing system comprising: a content input configured to receive content items of the content publication platform, each of which relates to a piece of published content and is associated with a user identifier of one of the users who has published or consumed that piece of content; a plurality of content processors for processing the content items; a content allocator configured to allocate the content items to the content processors based on the user identifiers associated with the content items; and a total count generator; wherein each of the user identifiers is assigned to one of the content processors, and the content allocator is configured to allocate all of the content items associated with that user identifier to that same content processor; wherein each of the content processors is configured to generate, from the content items allocated to it, a local user count indicating a number of unique user identifiers associated with those content items, wherein the total count generator is configured to generate, by summing the local user counts from all of the content processors, a total user count indicating a total number of unique users of the content publishing platform.

Allocating the content items in this way allows the local and total users count to be generated extremely quickly and efficiently, as explained in detail later.

At each of the content processors, the content items allocated to that content processor may be stored in local storage of that content processor.

The content items may be grouped in the local storage according to the user identifiers associated with those content items with one group per user identifier.

The content processing system may comprise a filter coordinator configured to instruct each of the content processors to apply a filter, thereby causing each of the content processors to filter the content items allocated to it according to the filter and generate its local user count from the filtered content items, wherein the local user count indicates a number of unique users for the content items allocated to that content processor that satisfy the filter, whereby the total user count indicates a total number of unique users who satisfy the filter.

In the case that the content items are stored and grouped locally, each of the content processors may be configured to repeatedly apply a boundary counting procedure to the grouped content items to selectively increment a local boundary count as follows: applying the boundary counting procedure for an initial one of the groups by: for each of the items in that group, determining whether that content item satisfies the filter, incrementing the local boundary count only if at least one of those content items satisfied the filter, and repeating the boundary counting procedure for a next one of groups; wherein the boundary counting procedure terminates once it has been applied for all of the user identifiers assigned to that content processor, wherein that content processor unit's local user count comprises or is derived from its local boundary count after the termination of the boundary counting procedure.

Each of the user identifiers may be associated with a set of user attributes, and the content items may be filtered based on the user attributes associated with the user identifiers; or at least some of the content items may comprise metadata (e.g. at least some which may be derived from the pieces of content) and the content items may be filtered based on the metadata in the content items; or the content items may be filtered based on a combination of the user attributes and the metadata.

The content processing system may comprise a query handler for handling queries submitted to the content processing system, and the query handler may be configured to respond to a submitted query with a result comprising or derived from the total user count.

The filter may be defined in the query and the filter coordinator may instruct the content processors to apply the defined filter in response to the submission of the query.

Each of the content items may comprise a copy of the user identifier with which it is associated, thereby associating that content item with that user identifier.

Each of the content processor may be a processing unit or a thread. For example, each of the content processing units may be a CPU core thread in a server (in which case the total user count is a count for that server).

Alternatively, each of the content processors may comprise multiple processing units or multiple threads. For example, the content processing units may be servers (in which case the total user count is a count across those servers). In that case, each content processor may be configured to apply the boundary counting procedure in parallel to multiple sub-partitions of the content items allocated to it, wherein each of the user identifiers for that content processor is assigned to only one of the sub-partitions and all of the content items associated with that user identifier are in that same partition, wherein the local user account for that content processor is generated by summing resulting local user counts for the sub-partitions.

To cover other application, a system for processing user events from a platform having a plurality of users may be provided, the system comprising: an input configured to receive user events of the platform, each of which is associated with an identifier of one of users of the platform; a plurality of event processors for processing the user events; an event allocator configured to allocate the user events to the event processors based on the user identifiers associated with the events; and a total count generator; wherein each of the user events is assigned to one of the event processors, and the event allocator is configured to allocate all of the user events associated with that user identifier to that same event processor; wherein each of the event processors is configured to generate, from the user events allocated to it, a local user count indicating a number of unique user identifiers associated with those user events, wherein the total count generator is configured to generate, by summing the local user counts from all of the event processors, a total user count indicating a total number of unique users of the platform.

In this context, each event can be any event relating to the user with which it is associated. Each of the user events may relate to an action performed by or otherwise relating to one of the users of the platform and comprise an identifier of that user. That is, each of the user events may be a record of a user-related action on the platform.

Whilst these events can relate to social interactions on a social media platform (publishing/consuming content), the fourth aspect of the invention is not limited to this and the system can be used for processing other types of events and the platform can be any platform with a user base that facilitates user actions. The platform provider could for example be a telecoms operator like Vodafone or Verizon, a car-hire/ride-share platform like Uber, an online market place like Amazon, a platform for managing medical records. The events can for example be records of calls, car rides, financial transactions, changes to medical records etc. conducted, arranged or performed via the platform. There are numerous scenarios in which it is beneficial to extract anonymous and aggregated information from such events, where the need to obtain a user count over a set of such events arises.

In this respect, it is noted that all description pertaining to interaction events of a social media platform (content items) herein applies equally to other types of events of platforms other than social media. Such events can comprise or be associated with user attributes and/or metadata for the actions to which they relate, allowing those events to be processed (e.g. filtered and/or aggregated) using any of the techniques described herein.

For example, the system may comprise a filter coordinator configured to instruct each of the event processors to apply a filter, thereby causing each of the event processors to filter the user events allocated to it according to the filter and generate its local user count from the filtered user events, wherein the local user count indicates a number of unique users for the user events allocated to that event processor that satisfy the filter, whereby the total user count indicates a total number of unique users who satisfy the filter.

A randomization component of the system can randomly generate error data and apply it to intentionally introduce an artificial error in to the total count (either directly or in at least one of the local counts) in the manner described above.

Exact User Count

A notable feature of the filtering and counting process described above is that, in contrast to the probabilistic HLL approximation, the total user count obtained by the process is exact. Obtaining an exact user count is clearly desirable in some contexts, and in that respect is another tangible benefit of the present invention with respect to existing probabilistic methodologies, such as HLL.

However, as noted, the inventors of the present invention have recognized that in the present context, namely extracting anonymized, aggregate information, moving from an approximate user count (with an inherent error) to an exact user count could in fact open up the content sharing system 202 to a specific form of attack that allows individual users to be identified in certain circumstances—hence the additional steps that are taken to prevent this.

It will be appreciated that the above embodiments have been described only by way of example. Other variations and applications of the present invention will be apparent to the person skilled in the art in view of the disclosure given herein. The present invention is not limited by the described embodiments, but only by the appendant claims.

The invention claimed is:

1. A method of processing user events of a platform to extract aggregate information about users of the platform, the method comprising, at an event processing system:
   initializing a privacy policy with an event processing system;
   receiving, at the event processing system, a query relating to the user events;
   determining, from the query, by the event processing system, at least one query parameter for each of a plurality of buckets;
   for each of the buckets, computing with the event processing system, for a set of the user events satisfying the at least one query parameter for that bucket, an approximate unique user count with an error margin of at least two percent;
   comparing, by the event processing system, the approximate unique user count for each bucket with a bucket redaction threshold;
   applying, by the event processing system, quantization to the approximate unique user count for at least one of the buckets to generate a quantized unique user count for that bucket; and
   responding to the query by releasing, from the event processing system, aggregate information comprising or derived from the quantized unique user count, wherein any of the buckets for which the approximate unique user count is below a minimum user count indicated by the bucket redaction threshold is redacted, wherein no unique user count is released for any redacted bucket.

2. A method according to claim 1, comprising:
   computing for each of the buckets an event count for the set of user events satisfying the at least one query parameter for that bucket, wherein no event count is released for any redacted bucket for which the approximate unique user count is below the minimum user count.

3. A method according to claim 2, wherein the event count for each bucket is an approximate event count.

4. A method according to claim 1, comprising:
   determining an approximate overall unique count for an overall set of the user events, each of the sets of user events being a subset of the overall set.

5. A method according to claim 4, comprising:
   comparing the overall unique user count with a gating threshold to determine whether to accept or reject the query, wherein the query is accepted in response to determining that overall unique user count is at least a minimum user count indicated by the gating threshold.

6. A method according to claim 4, comprising:
   determining at least one overall query parameter from the query, the overall set of user events being a set of the user events satisfying the at least one overall query parameter.

7. A method according to claim 6, wherein the platform is a content publication platform for publishing and consuming content, the user events relating to the publication and consumption of content by the users of the content publishing platform;
   wherein the at least one overall query parameter specifies particular content, and wherein the at least one query parameter for each of the buckets specifies at least one user attribute.

8. A method according to claim 6, wherein the platform is a content publication platform for publishing and consuming content, the user events relating to the publication and consumption of content by the users of the content publishing platform;
   wherein the at least one overall query parameter specifies at least one user attribute, and wherein the at least one query parameter for each of the buckets specifies particular content.

9. A method according to claim 1 wherein the platform is a content publication platform for publishing and consuming content, the user events relating to the publication and consumption of content by the users of the content publishing platform, and the at least one query parameter for each of the buckets specifies particular content.

10. A method according to claim 1, wherein the at least one query parameter for each of the buckets specifies at least one user attribute.

11. A method according to claim 1, wherein user events for users below an age threshold are not counted.

12. A method according to claim 1, wherein each of the user events comprises an identifier of one of the platform users and each unique user count is generated from the user identifiers in the set of user events.

13. A method according to claim 1, wherein the platform is a content publication platform for publishing and consuming content, the user events relating to the publication and consumption of content by the users of the content publishing platform.

14. A method according to claim 1, wherein the error margin is at least three percent.

15. A method according to claim 1, wherein the quantization has a quantization range of at least one hundred.

16. A method according to claim 1, wherein the error margin is a consequence of introducing an artificial error into an exact counting procedure applied to the user event.

17. A method according to claim 1, wherein the error margin is intrinsic to a probabilistic count estimation procedure applied to the user events to generate the count.

18. An event processing system for processing user events of a platform to extract aggregate information about users of the platform, the event processing system comprising:
   an input configured to receive a query relating to the user events;

an output configured to transmit a response to the query relating to the user events;

computer storage holding computer-readable instructions; and one or more hardware-based processing units coupled to the computer storage and configured to implement a privacy policy by executing the computer-readable instructions to carry out the following steps:

determining, from the query, by the one or more hardware-based processing units, at least one query parameter for each of a plurality of buckets;

for each of the buckets, computing with the one or more hardware-based processing units, for a set of the user events satisfying the at least one query parameter for that bucket, an approximate unique user count with an error margin of at least two percent;

comparing, by the one or more hardware-based processing units, the approximate unique user count for each bucket with a bucket redaction threshold;

applying, by the one or more hardware-based processing units, quantization to the approximate unique user count for at least one of the buckets to generate a quantized unique user count for that bucket; and responding to the query by releasing, via the output, aggregate information comprising or derived from the quantized unique user count, wherein any of the buckets for which the approximate unique user count is below a minimum user count indicated by the bucket redaction threshold is redacted, wherein no unique user count is released for any redacted bucket.

19. An event processing system according to claim 18, wherein the user events comprise content, wherein the at least one overall query parameter specifies at least one user attribute, and wherein the at least one query parameter for each of the buckets specifies particular content.

20. A computer program product for processing user events of a platform to extract aggregate information about users of the platform, the computer program product comprising executable instructions stored on a non-transitory computer-readable storage medium and configured, when executed on one or more processing units, to carry out the following steps:

initializing a privacy policy with one or more processing units of the platform;

receiving, at the platform, a query relating to the user events;

determining, from the query, by the one or more processing units, at least one query parameter for each of a plurality of buckets;

for each of the buckets, computing, with the one or more processing units, for a set of the user events satisfying the at least one query parameter for that bucket, an approximate unique user count with an error margin of at least two percent;

comparing, by the one or more processing units, the approximate unique user count for each bucket with a bucket redaction threshold;

applying, by the one or more processing units, quantization to the approximate unique user count for at least one of the buckets to generate a quantized unique user count for that bucket; and responding to the query by releasing, from the platform, aggregate information comprising or derived from the quantized unique user count, wherein any of the buckets for which the approximate unique user count is below a minimum user count indicated by the bucket redaction threshold is redacted, wherein no unique user count is released for any redacted bucket.

* * * * *